United States Patent
Stefansson et al.

(10) Patent No.: US 9,519,671 B1
(45) Date of Patent: Dec. 13, 2016

(54) FOLDING PAIR OF ADJACENT INDICES BASED ON OPTIMUM QUANTITY OF INDUCES FOR PARALLEL PROCESSING

(71) Applicant: The MathWorks, Inc., Natick, MA (US)

(72) Inventors: Halldor N. Stefansson, Natick, MA (US); Edric Ellis, St. Ives (GB)

(73) Assignee: The MathWorks, Inc., Natick, MA (US)

( * ) Notice: Subject to any disclaimer, the term of this patent is extended or adjusted under 35 U.S.C. 154(b) by 68 days.

(21) Appl. No.: 14/512,088

(22) Filed: Oct. 10, 2014

Related U.S. Application Data

(63) Continuation of application No. 13/107,647, filed on May 13, 2011, now Pat. No. 8,863,146.

(60) Provisional application No. 61/473,046, filed on Apr. 7, 2011.

(51) Int. Cl.
| | | |
|---|---|---|
| G06F 9/46 | (2006.01) | |
| G06F 17/30 | (2006.01) | |
| G06F 17/16 | (2006.01) | |

(52) U.S. Cl.
CPC .......... *G06F 17/30336* (2013.01); *G06F 9/46* (2013.01); *G06F 17/16* (2013.01); *G06F 17/30312* (2013.01); *G06F 17/30324* (2013.01); *G06F 17/30333* (2013.01)

(58) Field of Classification Search
None
See application file for complete search history.

(56) References Cited

U.S. PATENT DOCUMENTS

| | | | |
|---|---|---|---|
| 6,879,912 B2 * | 4/2005 | Chen ................. | G01C 21/3626 701/428 |
| 7,254,689 B1 * | 8/2007 | Dorward ............ | G06F 12/0802 710/61 |
| 7,400,764 B2 * | 7/2008 | Kryeziu ............... | H04N 19/46 375/E7.029 |
| 7,451,173 B1 * | 11/2008 | Van Benthem ........ | G06F 17/11 708/607 |
| 8,060,516 B2 | 11/2011 | Weissman | |

(Continued)

OTHER PUBLICATIONS

Altanis et al, Avoiding fold bifuractions with the help of new proximity indices, 2009, IEEE, 17th Mediterranean Conference on Control & Automation, pp. 1078-1083.*

(Continued)

*Primary Examiner* — Abu Ghaffari
(74) *Attorney, Agent, or Firm* — Harrity & Harrity, LLP

(57) ABSTRACT

A method comprising receiving data, where the data includes one or more elements, the data is associated with a first set of indices, and the first set of indices references the one or more elements. The method may further include folding a plurality of indices into a single index, where the single index references the one or more elements of the received data that were referenced by the plurality of indices, the folding generates a second set of indices, and the folding is performed when concurrent process threads are not generated based on the first set of indices. The method may further include determining whether concurrent process threads should be generated based on the second set of indices and generating the concurrent process threads for the second set of indices when the determining determines that the concurrent process threads should be generated based on the second set of indices.

20 Claims, 17 Drawing Sheets

(56) References Cited

U.S. PATENT DOCUMENTS

| | | | |
|---|---|---|---|
| 8,412,713 B2 | 4/2013 | Stewart et al. | |
| 8,499,001 B1 | 7/2013 | To | |
| 8,775,495 B2* | 7/2014 | Lumsdaine | G06F 17/16 708/520 |
| 8,863,146 B1 | 10/2014 | Stefansson et al. | |
| 9,069,808 B2* | 6/2015 | Kementsietsidis | G06F 17/30321 |
| 2003/0122584 A1* | 7/2003 | Boehm | G06F 17/16 326/105 |
| 2004/0199530 A1 | 10/2004 | Avadhanam et al. | |
| 2005/0108189 A1 | 5/2005 | Samsonov | |
| 2006/0013493 A1* | 1/2006 | Yang | H03M 7/4006 382/232 |
| 2006/0114264 A1* | 6/2006 | Weybrew | G06F 9/30021 345/592 |
| 2007/0294502 A1* | 12/2007 | Gunther | G06F 17/2247 711/173 |
| 2008/0306978 A1* | 12/2008 | Hoernkvist | G06F 17/30321 |
| 2009/0024643 A1* | 1/2009 | Mittal | G06F 17/30961 |
| 2009/0248778 A1* | 10/2009 | Magerlein | G06F 17/16 708/520 |
| 2010/0250504 A1 | 9/2010 | Balasubramanian et al. | |
| 2010/0312995 A1 | 12/2010 | Sung | |
| 2011/0066623 A1* | 3/2011 | Weissman | G06F 17/30613 707/742 |
| 2011/0208947 A1* | 8/2011 | Lin | G06F 17/30445 712/28 |
| 2011/0246449 A1 | 10/2011 | Collins et al. | |
| 2012/0011108 A1 | 1/2012 | Bensberg et al. | |
| 2012/0016864 A1 | 1/2012 | Goyal et al. | |

OTHER PUBLICATIONS

Harshman, An index formalism that generalizes the capabilities of matrix notation and algebra to n-way arrays, 2001, Journal of Chemometrics, vol. 15, pp. 689-714.*

Kourtis et al, Optimizing Sparse Matrix-Vector Multiplication Using Index and Value Compression, 2008, ACM, Proceedings of the 5th conference on Computing Frontiers, pp. 87-96.*

Koyuturk et al, Compression, Clustering, and Pattern Discovery in Very High-Dimensional Discrete-Attribute Data Set, 2005, IEEE, Transactions on Knowledge and Data Engineering, vol. 17, No. 4, pp. 447-461.*

Cosmo et al., "A Calculus for Parallel Computing Over Multidimensional Dense Arrays," 2006, Computer Languages, Systems & Structures ELSEVIER, 33 (2007), pp. 82-110.

* cited by examiner

FIG. 9B

FOLDING PAIR OF ADJACENT INDICES BASED ON OPTIMUM QUANTITY OF INDUCES FOR PARALLEL PROCESSING

RELATED APPLICATIONS

This application is a continuation of U.S. patent application Ser. No. 13/107,647, filed May 13, 2011 (now U.S. Pat. No. 8,863,146), which is a non-provisional of U.S. Patent Application Ser. No. 61/473,046, filed Apr. 7, 2011, the disclosures of which are incorporated herein by reference.

BACKGROUND INFORMATION

Data may be stored or represented as an array, a list, a matrix, or another type of data structure that includes one or more data elements, where the data elements may be referenced by one or more indices. For example, data elements of a 2 by 2 matrix $A=\{a_{11}, a_{12}, a_{21}, a_{22}\}$ may be referenced by two indices i and j, such that $A(i,j)$ with particular values of i and j may refer to a particular data element of A. For instance, $A(1,1)$ may refer to data element $a_{11}$; $A(1,2)$ may refer to data element $a_{12}$; etc.

Data structures holding large numbers of elements can be of substantially any size. For example, data structures can include millions of data elements. Processing activities performed on large data structures may be unacceptably slow when processing is performed in a serial fashion, e.g., using a single core, using a single processing thread, etc. In an effort to reduce processing times, elements in large data structures may be processed in parallel using multiple processing devices. Processing elements from large data structures may not produce expected efficiencies because the parallel processing devices may only be able to handle a small and finite number of indices. For example, a parallel processing device may be unable to process an arbitrary number of indices, where the arbitrary number of indices are needed to achieve an expected processing efficiency or time.

BRIEF DESCRIPTION OF THE DRAWINGS

FIG. 9A is a diagram of a first example of a data structure before and after an index folding operation according to an implementation described herein;

FIG. 9B is a diagram of a second example of a data structure before and after an index folding operation according to an implementation described herein;

DETAILED DESCRIPTION OF PREFERRED EMBODIMENTS

Figure 1:
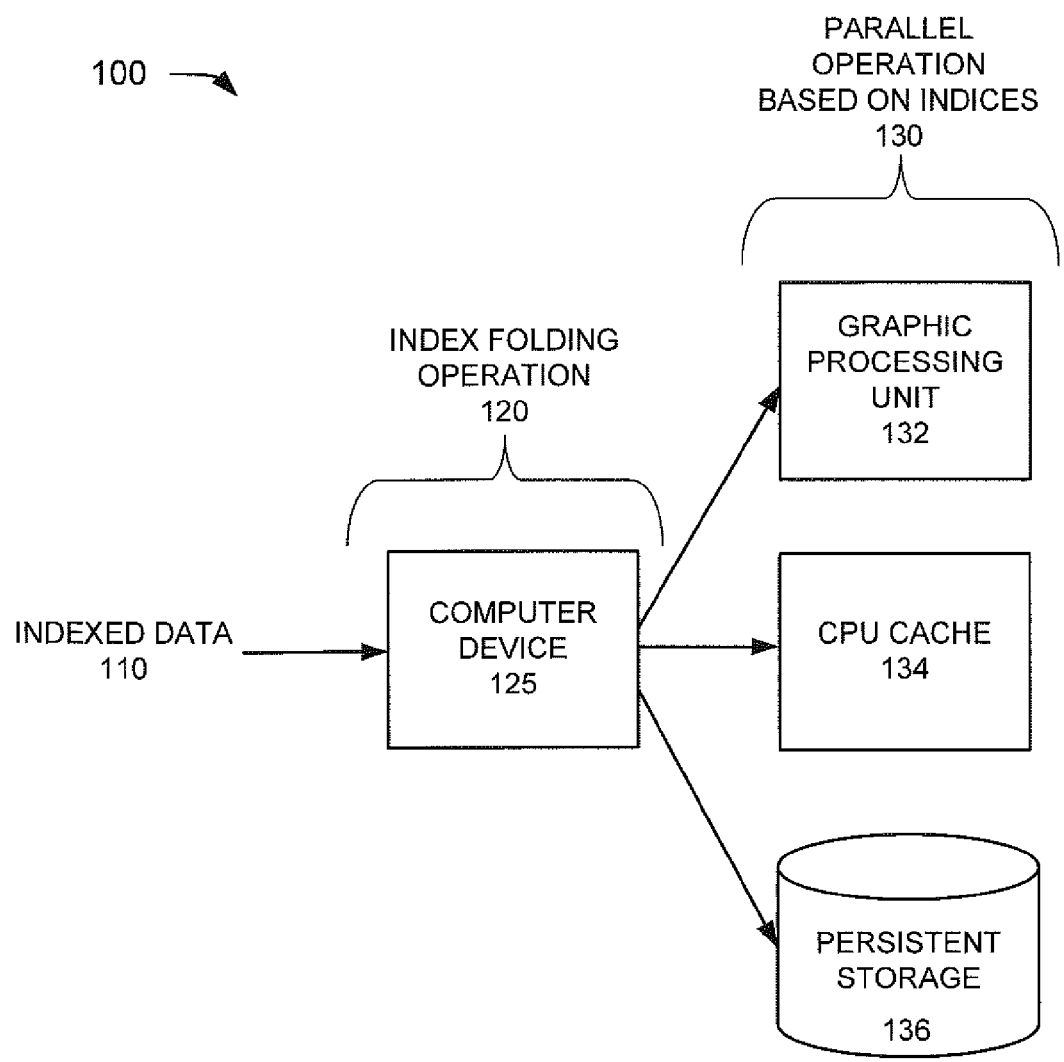
FIG. 1 is a diagram illustrating an example of components of a system according to an implementation described herein.

The following detailed description refers to the accompanying drawings. The same reference numbers in different drawings identify the same or similar elements. Also, the following detailed description does not limit the invention.

An implementation described herein may relate to efficient index folding for parallel operations. A parallel operation may include a group of operations that at least partially overlap temporally. In other words, a first process and a second process may be part of a parallel operation if the first process is running at substantially a same time as the second process for at least part of that the first process is running Examples of devices that may perform parallel operations on indexed data may include a graphic processing unit (GPU) device that performs parallel computations, a central processing unit (CPU) device with a cache that performs parallel cache accesses, a multi-core processor capable of running two or more temporally overlapping processing threads, and/or a persistent storage device that performs parallel file accesses. An index folding process may refer to converting a pair of indices into a new single index.

An indexing expression may include an arbitrary number of indices. In order to perform a parallel operation on a set of data referenced by the indexing expression, processing may need to be divided among multiple concurrent threads of execution. For example, each thread may execute the same operation on one or more different elements of a data set. A data set may be split into data blocks of a particular dimension (e.g., a one dimensional block, a two dimensional blocks, a three dimensional block, etc.) and each thread may operate on a particular data block. However, a device, or a group of devices, which is to perform the parallel operation, may not be associated with a multithreaded process that can generate the concurrent threads for an arbitrary number of indices. Thus, the arbitrary number of indices may need to be transformed to a fixed number of indices that can be handled by the parallel operation. The arbitrary number of indices in the indexing expression may be reduced to the fixed number of indices using a process of index folding. Index folding may refer to converting a pair of indices into a new single index that references one or more data elements referenced by the pair of indices.

One solution to handle an indexing expression with an arbitrary number of indices may be to reduce the indexing expression down to a single index that treats data referenced by the indexing expression as a one dimensional array. However, an indexing expression with a single index may be complicated, may result in a large amount of memory being used when the data is being processed, and/or may result in an available optimization not being utilized. For example, a system may include an efficient memory copying operation that uses 3 indices and, if an indexing expression with 4 indices is reduced down to a single index, the efficient memory copying operation may not be utilized. Therefore, a more efficient solution may include reducing a number of indices in an indexing expression down to a smaller number of indices through index folding, without having to reduce the indexing expression down to a single index.

An implementation described herein may relate to receiving indexed data references using an arbitrary number of indices, determining the number of indices that can be handled by a particular parallel operation, and determining whether the number of indices associated with the received indexed data can be handled by the particular parallel operation. If the number of indices cannot be handled by the parallel operation, index folding may be performed. Additionally or alternatively, an optimum number of indices may be determined for the particular parallel operation and index folding may be performed to reduce an indexing expression, associated with the received indexed data, down to the optimum number of indices. For example, an optimum number of indices may be based on identifying an existing function or process that uses a particular number of indices.

An index folding operation may include selecting a pair of indices to fold, reshaping a virtual representation of the indexed data, generating an indexed expression for a single index based on the selected pair of indices, and applying the generated indexing expression to the reshaped data to generate a new indexing expression with folded indices. The generated indexing expression with the folded indices may be used to perform one or more parallel operations that execute at least partially concurrent threads to process data referenced by the indexing expression. During the one or more parallel operations, one or more elements of the data may be accessed based on indices of the generated indexing expression, to, for example, extract values from the one or more elements or to assign new values to the one or more elements.

Selecting a pair of indices to fold may include identifying a target environment of a parallel operation to be executed, determining characteristics of the target environment, and selecting the pair of indices based on determined characteristics of the target environment. For example, in a situation where contiguous selections of one or more data elements in indices need to be preserved, selecting a pair of indices may include selecting a pair of adjacent indices that both reference all elements of an index to fold into a single index, when such a pair of adjacent indices exists; selecting a pair of adjacent scalar indices to fold into a single scalar index, when a pair of adjacent scalar indices exists; and, when no pair of adjacent indices that both reference all elements of an index exists, and when no pair of adjacent scalar indices exists, selecting a pair of adjacent indices with the smallest product of number of referenced elements.

An indexing expression may be received, or generated by, a first set of one or more processors, where the indexing expression is to be executed by a parallel kernel. A parallel kernel may include a second set of one or more processors that are able to perform parallel operations on the indexing expression. Based on an analysis of the indices of the indexing expression and the performance characteristics of the second set of one or more processors, index folding may be performed on the indexing expression to fold one or more indices of the indexing expression, in order to optimize execution of the indexing expression by the second set of one or more processors. The second set of one or more processors may process the indexing expression with the folded indices, using zero or more sequential operations and one or more parallel operations.

The first set of one or more processors and the second set of one or more processors may refer to the same set of processors or to a different set of processors of a same type or of a different type. In one example, the first set of one or more processors may include one or more single-core CPU processors, may be part of a multi-core CPU processor, or may include a combination of single-core CPU processors and multi-core CPU processors; and the second set of one or more processors may include one or more multi-core GPU processors. In another example, the first set of processors and the second set of processors may each be part of a different multi-core CPU processor or may both be part of a same multi-core CPU processor. In yet another example, the first set of processors and the second set of processors may each be part of different multi-core GPU processors or may both be part of a same multi-core GPU processor.

In yet another example, the second set of processors may include one or more CPU processors that are able to perform parallel cache accesses on a cache memory associated with the one or more CPU processors based on the indexing expression. In yet another example, the second set of processors may include on or more persistent storage devices that are able to perform parallel file accesses based on the indexing expression.

FIG. 1 is a diagram of an example system 100 according to an implementation described herein. As shown in FIG. 1, system 100 may include a computer device 125, a graphic processing unit (GPU) device 132, a central processing unit (CPU) cache device 134, and a persistent storage device 136.

Computer device 125 may include a computation device that includes one or more processors, such as a personal computer, a wireless telephone, a personal digital assistant (PDA), a laptop, a tablet, or another type of computation or communication device. Computer device 125 may process an indexing expression on indexed data 110 and may perform an index folding operation 120 on an indexing expression that references indexed data 110. Indexed data 110 may be retrieved from a data store associated with computer device 125, may be received by computer device 125 from a remote device across a network, or may be received in real time as streaming data from a local device associated with computer device 125 or from a remote device across a network. In one example, computer device 125 may include a textual or graphical modeling application.

GPU device 132 may include one or more devices that include specialized circuits for performing operations relating to graphics processing (e.g., block image transfer operations, simultaneous per-pixel operations, etc.) and/or for performing a large number of operations in parallel. For example, computer device 125 may generate processing threads, based on indices of an indexing expression, that process data referenced by the indexing expression. GPU device 132 may perform a parallel operation 130 based on the indices by executing the processing threads in parallel (e.g., substantially simultaneously).

CPU cache device 134 may include one or more devices that include a CPU, associated with a cache memory, where the CPU may perform multiple accesses to the cache memory in parallel. For example, computer device 125 may process an indexing expression, associated with indexed data, using CPU threads. CPU cache device 134 may perform a parallel operation 130 by performing parallel cache memory accesses of the indexed data based on the indices of the indexing expression. In one example, CPU cache device 134 may correspond to (or be included within) computer device 125. In another example, CPU cache device 134 may include a device separate from computer device 125.

Persistent storage device 136 may include one or more persistent storage devices (e.g., non-transitory computer-readable media), such as a floppy disk device, a hard disk device, an optical disk device, a tape device, a flash memory or other similar solid state memory device, or an array of devices, including devices in a storage area network or other configurations. Computer device 125 may process an indexing expression, associated with indexed data stored by persistent storage device 136. Persistent storage device 136 may perform a parallel operation 130 by performing parallel file accesses of the indexed data based on the indices of the indexing expression.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
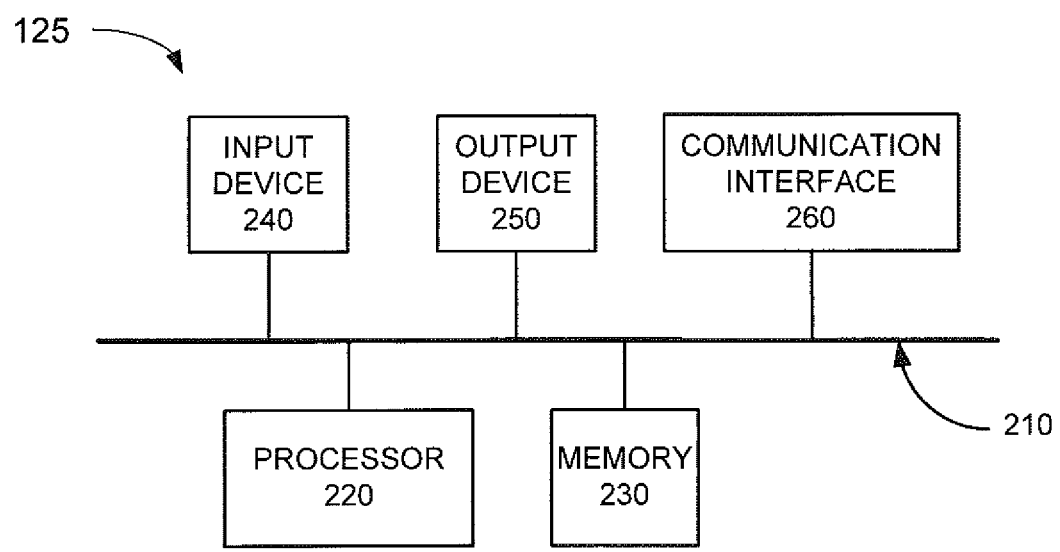
FIG. 2 is a diagram illustrating example components of a computer device according to an implementation described herein.

FIG. 2 is a diagram illustrating example components of computer device 125 according to a first implementation described herein. As shown in FIG. 2, computer device 125 may include a bus 210, a processor 220, a memory 230, an input device 240, an output device 250, and a communication interface 260.

Bus 210 may include a path that permits communication among the components of computer device 125. Processor 220 may include one or more single-core and/or or multi-core processors, microprocessors, and/or processing logic (e.g., application specific integrated circuits (ASICs), field programmable gate arrays (FPGAs), ARM processors, etc.) that may interpret and execute instructions. Memory 230 may include a random access memory (RAM) device or another type of dynamic storage device that may store information and instructions for execution by processor 220, a read only memory (ROM) device or another type of static storage device that may store static information and instructions for use by processor 220, a magnetic and/or optical recording memory device and its corresponding drive, and/or a removable form of memory, such as a flash memory.

Input device 240 may include a mechanism that permits an operator to input information to computer device 125, such as a keypad, a keyboard, a button, or an input jack for an input device such as a keypad or a keyboard, etc. Output device 250 may include a mechanism that outputs information to the operator, including one or more light indicators, a display, a speaker, etc.

Communication interface 260 may include any transceiver-like mechanism that enables computer device 125 to communicate with other devices and/or systems. For example, communication interface 260 may include a modem, a network interface card, and/or a wireless interface card.

As will be described in detail below, computer device 125 may perform certain operations. Computer device 125 may perform these operations in response to processor 220 executing software instructions stored in a computer-readable medium, such as memory 230.

The software instructions may be read into memory 230 from another computer-readable medium, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of computer device 125, in other implementations, computer device 125 may include fewer components, different components, additional components, or differently arranged components than depicted in FIG. 2. Additionally or alternatively, one or more components of computer device 125 may perform one or more tasks described as being performed by one or more other components of computer device 125. For example, computer device 125 may correspond to an embedded processor that does not include input device 240 and/or output device 250.

Figure 3:
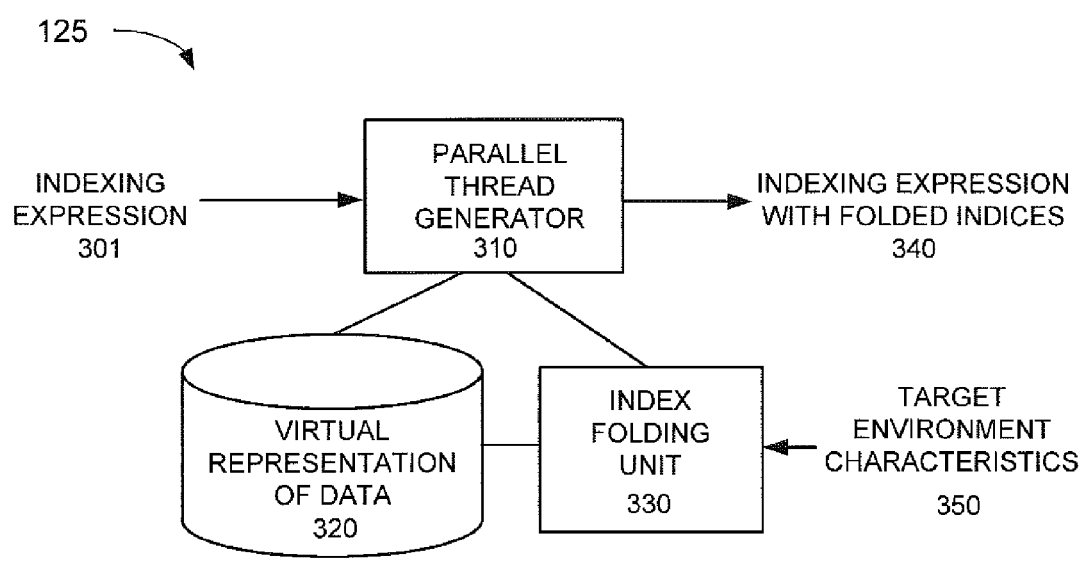
FIG. 3 is a diagram of example functional components of a computer device according to an implementation described herein.

FIG. 3 is a diagram of example functional components of computer device 125 according to an implementation described herein. As shown in FIG. 3, computer device 125 may include a parallel thread generator 310, a virtual representation of data unit 320, and an index folding unit 330.

Parallel thread generator 310 may receive a request to process an indexing expression 301 that includes a particular number of indices. Parallel thread generator 310 may select a device or process to process indexing expression 301 and may determine whether the selected device or process is able to process the particular number of indices. Additionally or alternatively, parallel thread generator 310 may determine an optimum number of indices associated with the selected device or process. If the device or process is able to handle the particular number of indices, and/or if the particular number of indices corresponds to the optimum number of indices associated with the selected device or process, parallel thread generator 310 may generate parallel process threads based on indices included in the received indexing expression.

If the device or process is unable to handle the particular number of indices, parallel thread generator 310 may activate index folding unit 330. Once parallel thread generator 310 receives a new indexing expression from index folding unit 330, parallel thread generator 310 may generate parallel process threads based on indices included in the new indexing expression received from index folding unit 330.

Virtual representation unit 320 may store a virtual representation of indexed data associated with an indexing expression. The virtual representation of the indexed data may be reshaped by index folding unit 330 during an index folding process to correspond to a new indexing expression with folded indices.

Index folding unit 330 may select a pair of indices to fold in an indexing expression received from parallel thread generator 310. Index folding unit 330 may determine target environment characteristics 350 associated with indexing expression 301 and may select the pair of indices to fold based on the determined characteristics of the target environment. Target environment characteristics 350 may be retrieved from a data store storing information about target environments, may be received from the target environment associated with indexing expression 301 based on a query submitted by index folding unit 330, and/or may be obtained by another technique.

Although FIG. 3 shows example functional components of computer device 125, in other implementations, computer device 125 may include fewer functional components, different functional components, differently arranged functional components, or additional functional components than depicted in FIG. 3. Additionally or alternatively, one or more functional components of computer device 125 may perform one or more tasks described as being performed by one or more other functional components of computer device 125.

Figure 4A:
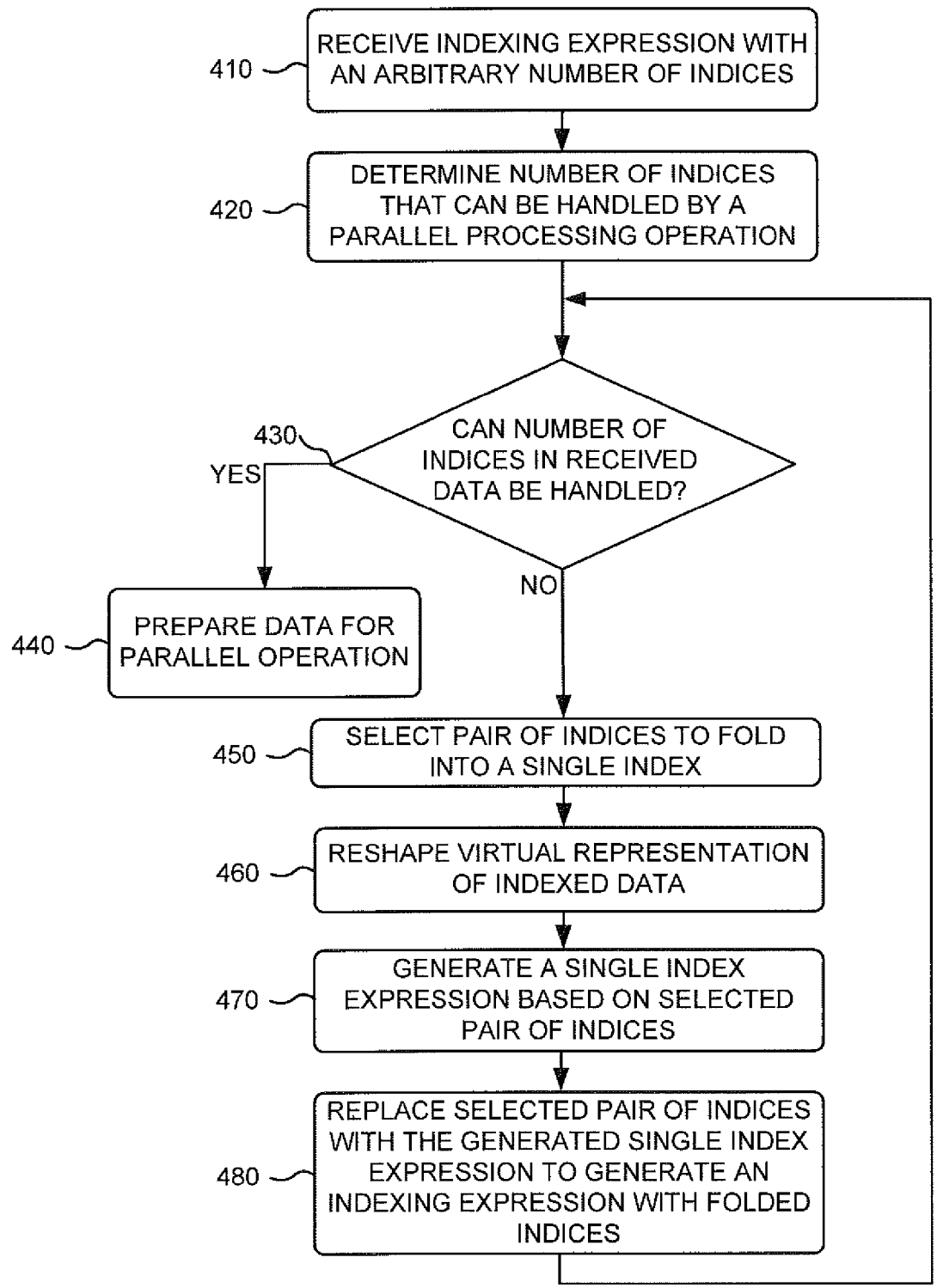
FIG. 4A is a flow diagram of a first example process for performing efficient index folding according to an implementation described herein.

FIG. 4A is a flow diagram of a first example process for performing efficient index folding according to an implementation described herein. In one implementation, the process of FIG. 4A may be performed by computer device 125. In other implementations, some or all of the process of FIG. 4A may be performed by another device or a group of devices separate from and/or possibly remote from computer device 125 and/or including computer device 125.

The process of FIG. 4A may include receiving an indexing expression with an arbitrary number of indices (block 410). For example, parallel thread generator 310 may receive an indexing expression referencing indexed data 110, where the indexing expression may include any number of indices. The indexing expression may be associated with a parallel processing operation that is to be performed using the indexing expression. An example indexing expression in the MATLAB® language may include:

$$B=GPU\_funct\_1(A(X\_1,X\_2,X\_3,X\_4)) \quad (Exp.\ 1)$$

Expression (1) may perform a function called GPU_funct_1 on one or more particular data elements of data structure A, as specified by indices X_1, X_2, X_3, and X_4, and may return the results of the operation into data structure B.

A number of indices that can be handled by a parallel processing operation may be determined (block 420). For example, parallel thread generator 310 may determine a device and/or process associated with the parallel processing operation and may determine a number of parallel threads that can be handled by the device and/or process. Parallel thread generator 310 may determine whether the indexing expression may be used to generate parallel threads based on the indices of the indexing expression or whether the number of indices needs to be reduced. In the example of expression (1), GPU_funct_1 may be performed by GPU device 132.

A determination may be made as to whether the number of indices in the received indexing expression can be handled (block 430). For example, parallel thread generator 310 may determine whether the number of indices in the received indexing expression exceeds the number of indices for which parallel threads may be generated. For explanatory purposes, assume that GPU device 132 is only able to handle 3 indices.

If it is determined that the number of indices in the received indexing expression can be handled (block 430—YES), the received data may be prepared for a parallel operation (block 440). For example, parallel thread generator 310 may generate parallel threads for the parallel operation based on the received indexing expression. If it is determined that the number of indices cannot be handled (block 430—NO), a pair of indices may be selected to be folded into a single index (block 450). For example, parallel thread generator 310 may activate index folding unit 330 and index folding unit 330 may select a pair of indices to fold into a new index. Example processes for selecting a pair of indices to fold are described below with reference to FIGS. 5A and 5B.

A virtual representation of the indexed data may be reshaped (block 460). When the indexed data is reshaped, the shape of the stored data itself may not be changed. Rather, a virtual representation of the data may be stored by virtual representation unit 320. For example, index folding unit 330 may generate a virtual representation of the indexed data and may reshape the virtual representation of the indexed data based on a number of indices that will remain after the selected pair of indices is folded into the new index. Thus, for example, data associated with an indexing expression with four indices may be treated by computer device 125 as a four dimensional matrix, where each of the four indices specifies one or more values in one of the four dimensions, and where the indices together reference a particular data element, or a subset of data elements, in the four dimensional matrix. In this case, folding two indices into a single index may result in an indexing expression with three indices. Thus, the virtual representation of the data may be reshaped into a three dimensional matrix. Continuing with the example of expression (1), assume indices X_2 and X_3 were selected to be folded. In response to selecting indices X_2 and X_3, data structure A may be reshaped with the following:

$$A\ mod = reshape(A, size(A,1), size(A, size(A,2)*size(A,3)), size(A,4)) \quad (Exp.\ 2)$$

In expression (2), the 'reshape (A, dim1, dim2, . . . )' function may reshape data structure A into a data structure with a number of dimensions specified by the number of arguments following A, with a size of each dimension specified by the value of each argument (e.g., dim1 may specify a size of dimension 1). The 'size (A, dim)' function may return a size of the dimension of A specified by the value of 'dim'.

A single index expression may be generated based on the selected pair of indices (block 470). For example, index folding unit 330 may generate an expression for a single index based on the selected pair of indices. The generated single index expression may reference the same one or more data elements as referenced by the selected pair of indices. Continuing with the example of expression (1), a single index expression to fold indices X_2 and X_3 may be generated with the following:

$$X\_fold\_2\_3 = bsxfun(@plus, X\_2(:), size(A,2)*(X\_3(:))-1) \quad (Exp.\ 3)$$

In expression (3), the 'bsxfun(fun, A, B)' function may apply an element by element binary operation specified by 'fun' to elements of A and B. The ':' character may reference all elements of an index and '@plus' may specify an addition operation. Thus, expression (3) may calculate the value of X_2(i)+size (A, 2)*X_3(j)−1 for all combinations of i and j. The purpose of expression (3) may be to reference the same one or more data elements in the reshaped data structure Amod as were referenced by indices X_2 and X_3 in the original data structure A.

The selected pair of indices may be replaced with the generated single index expression to generate an indexing expression with folded indices (block 480). For example, index folding unit 330 may replace the selected pair of indices with the generated single index expression in the received indexing expression to generate an indexing expression with a folded pair of indices. Continuing with the example of expression (1), expression (1) may be rewritten as:

$$B \bmod = GPU\_funct\_1(A \bmod(X\_1, X\_fold\_2\_3, X\_4)) \quad \text{(Exp. 4)}$$

Expression (4) may now only include 3 indices, which may allow expression (4) to be executed by GPU device 132. Once an index folding expression with the folded pair of indices has been generated, parallel thread generator 310 may generate parallel threads based on expression (4) and forward the parallel threads to GPU device 132 for processing the parallel threads. Data structure B may be generated by reshaping data structure Bmod with the following:

$$B = \text{reshape}(B \bmod, \text{numel}(X\_1), \text{numel}(X\_2), \text{numel}(X\_3), \text{numel}(X\_4)) \quad \text{(Exp. 5)}$$

In expression (5), the 'numel(x)' function may return a value corresponding to the number of elements in x.

Figure 4B:
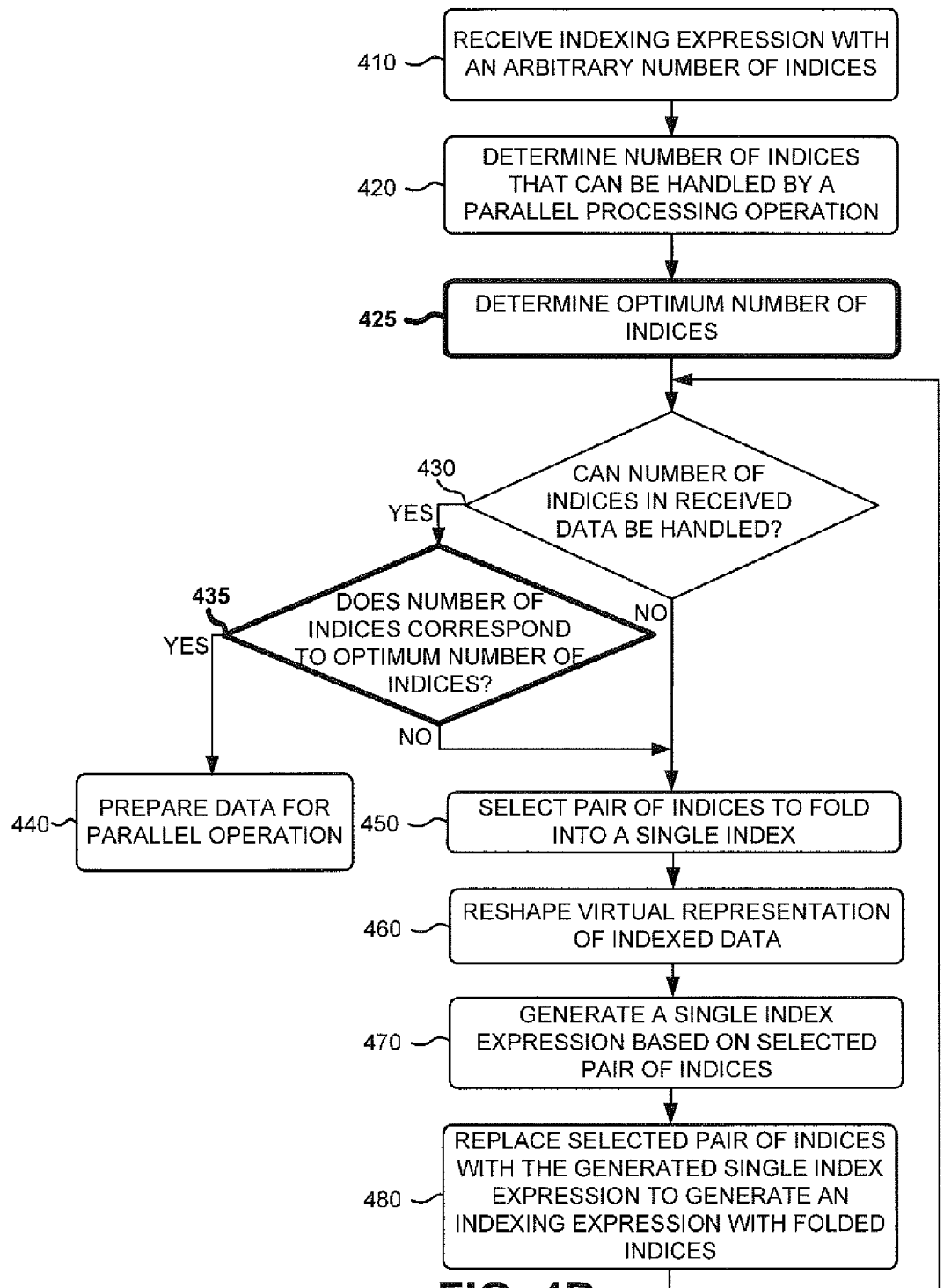
FIG. 4B is flow diagram of a second example process for performing efficient index folding according to an implementation described herein.

FIG. 4B is flow diagram of a second example process for performing efficient index folding according to an implementation described herein. In one implementation, the process of FIG. 4B may be performed by computer device 125. In other implementations, some or all of the process of FIG. 4B may be performed by another device or a group of devices separate from and/or possibly remote from computer device 125 and/or including computer device 125.

The process of FIG. 4B may include blocks 410, 420, 430, 440, 450, 460, 470, and 480, which may correspond to blocks 410, 420, 430, 440, 450, 460, 470, and 480 of FIG. 4A, respectively. Additionally, the process of FIG. 4B may include determining an optimum number of indices (block 425). For example, parallel thread generator 310 may determine whether there is an optimum number of indices associated with the device that is to perform the parallel processing operation. For example, a device or process may be able to handle a first number of indices, but may be associated with an efficient function or component that uses a particular number of indices. For example, GPU device 132 may include an efficient memory copy operation that copies blocks of three dimensional data, which may be referenced by 3 indices. Thus, in one example, GPU device 132 may be able to handle more than 3 indices, but 3 indices may be the optimum number of indices. Thus, GPU device 132 may handle indexing expressions with 3 indices faster than indexing expressions with a different number of indices.

A determination may be made as to whether the number of indices in the indexed data corresponds to the optimum number of indices (block 435). For example, after determining that the number of indices in the indexing expression can be handled (block 430—YES), a determination may be made as to whether the number of indices in the indexing expression corresponds to the optimum number of indices. For example, parallel thread generator 310 may compare a current number of indices in the indexing expression with the determined optimum number of indices.

If it is determined that the number of indices correspond to the optimum number of indices (block 435—YES), the data may be prepared for parallel operation (block 440). If it is determined that the number of indices does not correspond to the optimum number of indices (block 435—NO), processing may proceed to block 450 and continue as described above with reference to FIG. 4A.

Figure 5A:
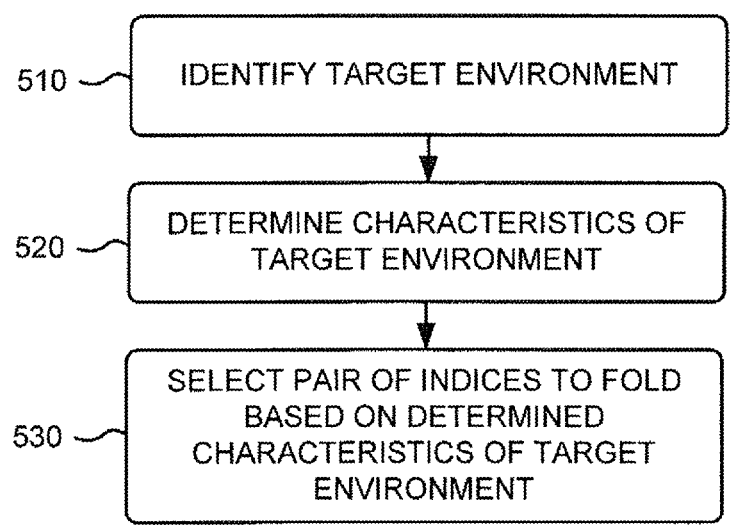
FIG. 5A is a flow diagram of a first example process for selecting a pair of indices to fold according to an implementation described herein.

FIG. 5A is a flow diagram of a first example process for selecting a pair of indices to fold according to an implementation described herein. In one implementation, the process of FIG. 5A may be performed by computer device 125. In other implementations, some or all of the process of FIG. 5A may be performed by another device or a group of devices separate from and/or possibly remote from computer device 125 and/or including computer device 125.

The process of FIG. 5A may include identifying a target environment (block 510). For example, index folding unit 330 may determine a particular device or process that is to perform a parallel operation on a set of data using a received indexing expression. Characteristics of the target environment may be determined (block 520). For example, index folding unit 330 may determine requirements associated with the determined device or process that is to perform the parallel operation as well as requirements associated with the parallel operation. For example, index folding unit 330 may determine that the parallel operation requires selection of contiguous blocks of data.

A pair of indices to fold may be selected based on the determined characteristics of the target environment (block 530). For example, index folding unit 330 may select a pair of indices to fold that will satisfy the determined requirements. In the example where selection of contiguous blocks of data is required, index folding unit 330 may select a pair of indices to fold that will preserve reference to contiguous blocks of data. Thus, if the selected pair of indices references a contiguous block of data, the new single index into which the selected pair of indices will be folded will also reference the block of data as a contiguous section.

Figure 5B:
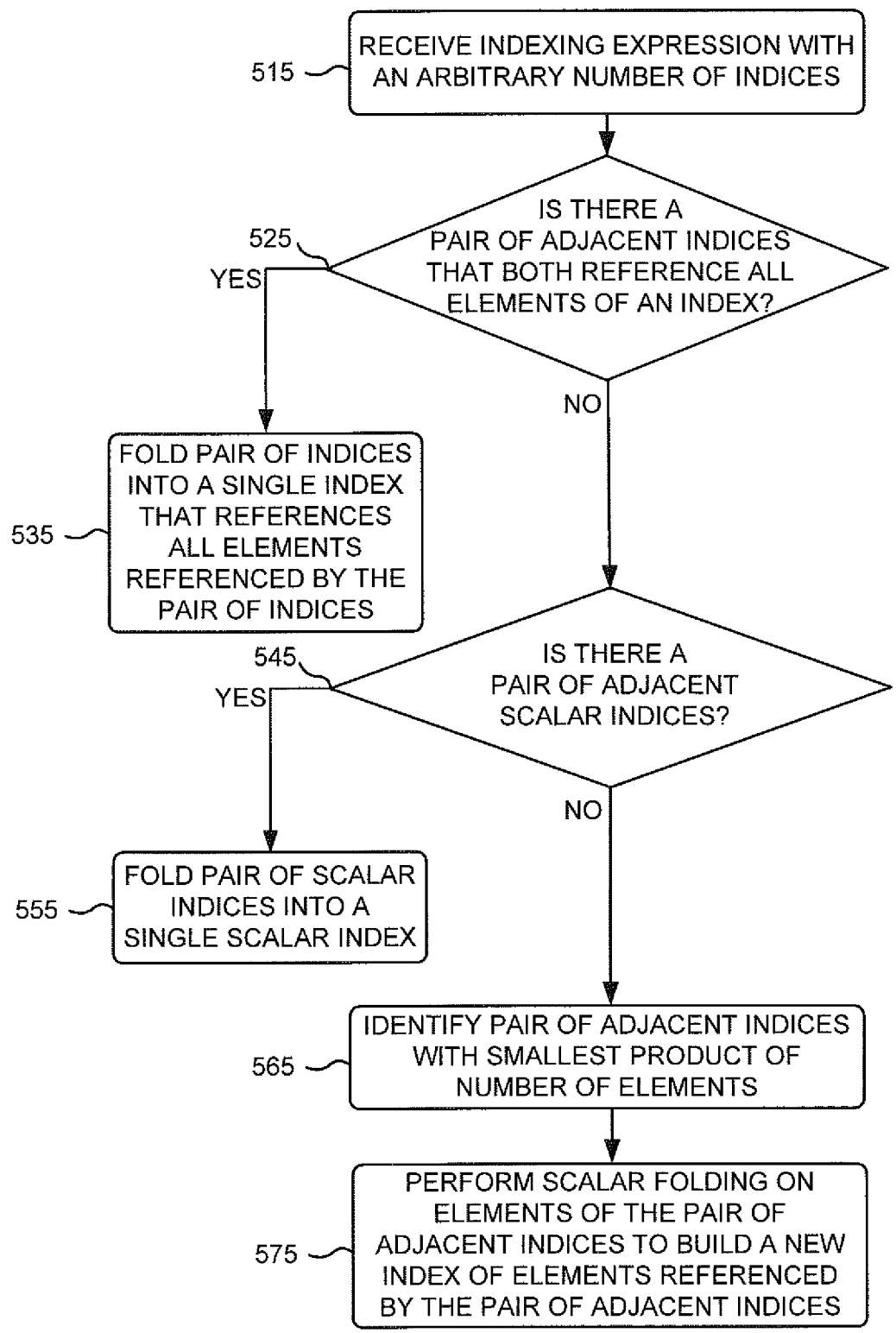
FIG. 5B is a flow diagram of a second example process for selecting a pair of indices to fold according to an implementation described herein.

FIG. 5B is a flow diagram of a second example process for selecting a pair of indices to fold according to an implementation described herein. In one implementation, the process of FIG. 5B may be performed by computer device 125. In other implementations, some or all of the process of FIG. 5B may be performed by another device or a group of devices separate from and/or possibly remote from computer device 125 and/or including computer device 125.

The process of FIG. 5B may include receiving an indexing expression with an arbitrary number of indices (block 515). For example, index folding unit 330 may receive an indexing expression to process from parallel thread generator 310. A determination may be made as to whether there exists a pair of adjacent indices that both reference all elements of an index (block 525). For example, index folding unit 330 may identify any indices that reference all elements of an index and determine whether any of the identified indices are adjacent. In one example, a ':' character may reference all elements of an index. For example, assume a data structure A includes the following data elements: $\{a_{11}, a_{12}, a_{13}, a_{21}, a_{22}, a_{23}, a_{31}, a_{32}, a_{33}\}$. Indexing expression A(:, 3) may reference all elements associated with the first index and associated with a value of 3 in the second index, namely, the following data elements: $\{a_{13}, a_{23}, a_{33}\}$. Thus, in an example indexing expression A(X_1, X_2, :, :, X_5), index folding unit 330 may determine that the third index and the fourth index are a pair of adjacent indices that both reference all elements of an index.

If it is determined that there exists a pair of adjacent indices that both reference all elements of an index (block 525—YES), the pair of adjacent indices may be folded into a single index that references all elements references by the pair of indices (block 535). For example, in the indexing expression A(X_1, X_2, :, :, X_5), index folding unit 330 may fold the third and fourth indices into a single index that references all elements of the third and fourth indices to generate indexing expression Amod(X_1, X_2, :, X_5).

If it is determined that there does not exist a pair of adjacent indices that both reference all elements of an index (block 525—NO), a determination may be made as to whether there exits a pair of adjacent scalar indices (block 545). For example, index folding unit 330 may identify scalar indices and may determine whether there exist any adjacent scalar indices. A scalar index may reference a single data element of an index. Thus, in an example indexing expression A(X_1, 5, 3, X_4, X_5), index folding unit 330 may determine that the second index and the third index are a pair of adjacent scalar indices.

If it is determined that there exists a pair of adjacent scalar indices (block 545—YES), the pair of adjacent scalar indices may be folded into a single scalar index (block 555). For example, in the indexing expression A(X_1, 5, 3, X_4, X_5), index folding unit 330 may fold the second and third indices into a single scalar index to generate indexing expression Amod(X_1, F, X_4, X_5), where F corresponds to a scalar value in reshaped data structure Amod.

If it is determine that there does not exist a pair of adjacent scalar indices (block 545—NO), a pair of adjacent indices with a smallest product of the number of elements may be identified (block 565). For example, index folding unit 330 may analyze pairs of adjacent indices to identify a pair of indices with a smallest product of the number of elements. By way of example, assume an index of the form [a:b] references data elements in the range from a to b. Then, for an indexing expression A([2:4], [2:5], [4:7], [4:10], [1:2]), the first index may reference 3 elements (e.g., elements associated with values 2, 3, and 4 in the first index), the second index may reference 4 elements (e.g., elements associated with values 2, 3, 4, and 5 in the second index), etc. Thus, the products of the number of elements for the pairs of adjacent indices may be calculated as: 3×4=12 for the first and second index; 4×4=16 for the second and third index; 4×7=28 for the third and fourth index; and 7×2=14 for the fourth and fifth index. Thus, in this indexing expression, index folding unit 330 may identify the first and second index as being an adjacent pair of indices with the smallest product of the number of elements.

Scalar folding may be performed on elements of the pair of adjacent indices to build a new index of elements referenced by the pair of adjacent indices (block 575). For example, index folding unit 330 may generate a new index that references the same elements as the selected pair of adjacent indices in the reshaped data structure and may replace the selected pair of adjacent indices with the generated new index. Thus, as an example, for the indexing expression A([2:4], [2:5], [4:7], [4:10], [1:2]), index folding unit 330 may generate a new index, by folding first index expression X_1=[2:4] and second index expression X_2=[2:5] using a X_1_2=bsxfun (@plus, X_1(:), size (A, 1)*(X_2(:)−1) function. Assuming the size of the first dimension of A, referenced by the first index, to be 10, the function may generate X_1_2=[21 22 23 31 32 33 41 42 43 51 52 53], resulting in an indexing expression of Amod([21 22 23 31 32 33 41 42 43 51 52 53], [4:7], [4:10], [1:2]). Indexing expression Amod([21 22 23 31 32 33 41 42 43 51 52 53], [4:7], [4:10], [1:2]) may reference the same data elements in reshaped data structure Amod as the data elements referenced by indexing expression A([2:4], [2:5], [4:7], [4:10], [1:2]) in data structure A.

Figure 6:
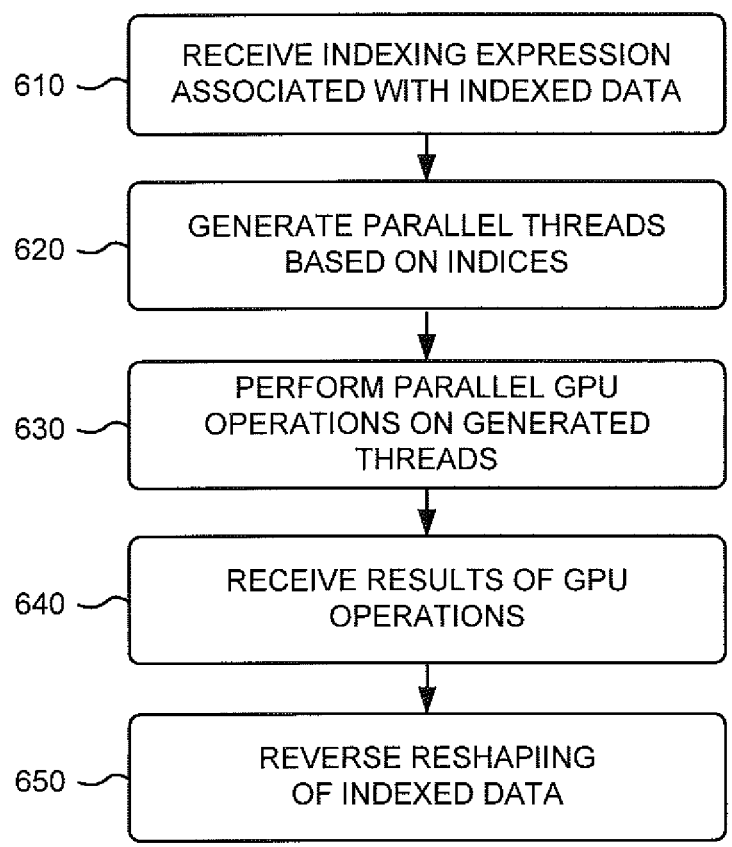
FIG. 6 is a flow diagram of an example process for performing an index folding operation in connection with a parallel graphics processing unit operation according to an implementation described herein.

FIG. 6 is a flow diagram of an example process for performing an index folding operation in connection with a parallel graphics processing unit operation according to an implementation described herein. In one implementation, the process of FIG. 6 may be performed by computer device 125 and GPU device 132. In other implementations, some or all of the process of FIG. 6 may be performed by another device or a group of devices separate from and/or possibly remote from computer device 125 and/or including computer device 125 and GPU device 132.

The process of FIG. 6 may include receiving an indexing expression associated with indexed data (block 610). For example, parallel thread generator 310 may receive a request to process an indexing expression, associated with indexed data, using GPU device 132. Parallel threads may be generated based on indices associated with the received indexed data (block 620). For example, index folding unit 330 may generate a reshaped virtual representation of the indexed data and may fold one or more pairs of indices in the received indexing expression (e.g., using the process described in FIG. 4A or 4B) to generate an indexing expression suitable for GPU device 132. Parallel thread generator 310 may generate parallel threads based on the indices associated with the generated indexing expression using the reshaped virtual representation of the indexed data.

Parallel GPU operations may be performed on the generated threads (block 630). For example, GPU device 132 may perform one or more parallel operations based on the indices associated with the generated indexing expression. Results of the GPU operations may be received (block 640). For example, computer device 125 may receive the results of the parallel operations performed by GPU device 132. Reshaping of the indexed data may be reversed (block 650). For example, index folding unit 330 may reshape the received results to retrieve a data structure with a shape that corresponds to the shape associated with received indexing expression (e.g., using an expression analogous to expression 5).

Figure 7:
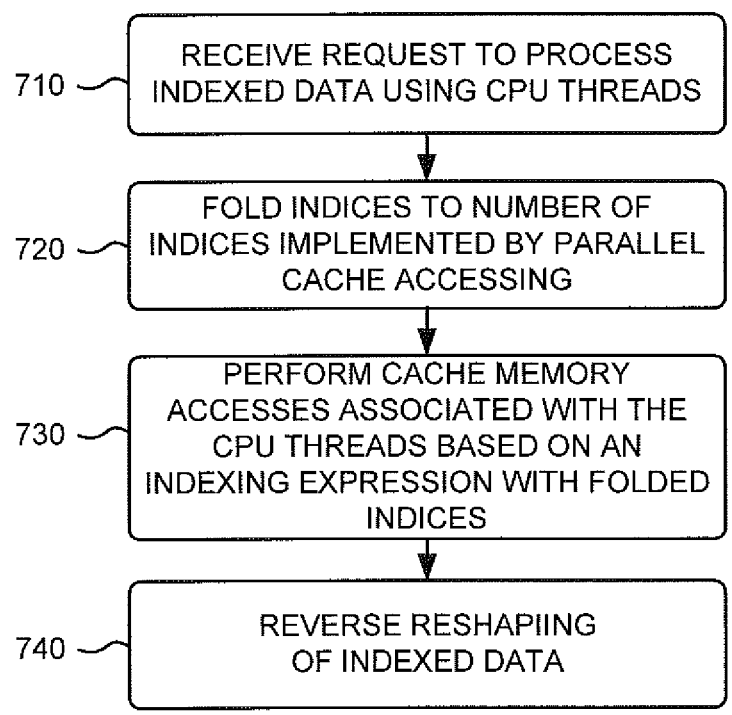
FIG. 7 is a flow diagram of an example process for performing an index folding operation in connection with a cache accessing operation according to an implementation described herein.

FIG. 7 is a flow diagram of an example process for performing an index folding operation in connection with a cache accessing operation according to an implementation described herein. In one implementation, the process of FIG. 7 may be performed by computer device 125 and CPU cache device 134. In other implementations, some or all of the process of FIG. 7 may be performed by another device or a group of devices separate from and/or possibly remote from computer device 125 and/or including computer device 125 and CPU cache device 134.

The process of FIG. 7 may include receiving a request to process indexed data using CPU threads (block 710). For example, parallel thread generator 310 may receive a request to process an indexed data structure stored in a cache associated with CPU cache device 134. Indices, associated with the indexed data, may be folded to a number of indices implemented by parallel cache accessing (block 720). For example, index folding unit 330 may generate a reshaped virtual representation of the indexed data and may fold one or more pairs of indices in the received indexing expression (e.g., using the process described in FIG. 4A or 4B) to generate an indexing expression that may be used by CPU cache device 134 to efficiently access the indexed data structure. As an example, CPU cache device 134 may include an efficient cache access function that uses two indices.

Cache memory accesses associated with the CPU threads may be performed based on an indexing expression with folded indices (block 730). For example, CPU cache device 134 may perform parallel cache accesses on the indexed data structure based on an indexing expression that includes the folded indices. Reshaping of the indexed data may be reversed (block 740). For example, index folding unit 330 may reshape the received results to retrieve a data structure with a shape that corresponds to the shape associated with received indexing expression (e.g., using an expression analogous to expression 5).

Figure 8:
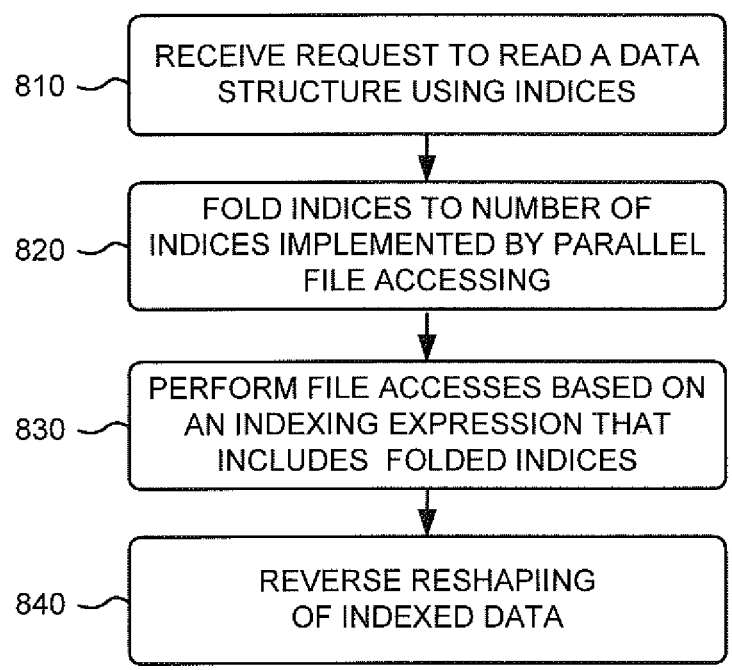
FIG. 8 is a flow diagram of an example process for performing an index folding operation in connection with a file accessing operation according to an implementation described herein.

FIG. 8 is a flow diagram of an example process for performing an index folding operation in connection with a file accessing operation according to an implementation described herein. In one implementation, the process of FIG. 8 may be performed by computer device 125 and persistent storage device 136. In other implementations, some or all of the process of FIG. 8 may be performed by another device or a group of devices separate from and/or possibly remote from computer device 125 and/or including computer device 125 and persistent storage device 136.

The process of FIG. 8 may include receiving a request to read a data structure using indices (block 810). For example, parallel thread generator 310 may receive a request to process an indexed data structure stored in a cache associated with persistent storage device 136. Indices may be folded to a number of indices implemented by parallel file accessing (block 820). For example, index folding unit 330 may generate a reshaped virtual representation of the indexed data and may fold one or more pairs of indices in the received indexing expression (e.g., using the process described in FIG. 4A or 4B) to generate an indexing expression that may be used by persistent storage device 136 to efficiently access the indexed data structure. As an example, persistent storage device 136 may include an efficient access function that uses two indices.

File accesses may be performed based on an indexing expression that includes the folded indices (block 830). For example, CPU cache device 134 may perform parallel accesses on the indexed data structure based on an indexing expression that includes the folded indices. Reshaping of the indexed data may be reversed (block 840). For example, index folding unit 330 may reshape the received results to retrieve a data structure with a shape that corresponds to the shape associated with the received indexing expression (e.g., using an expression analogous to expression 5).

Figure 9A:
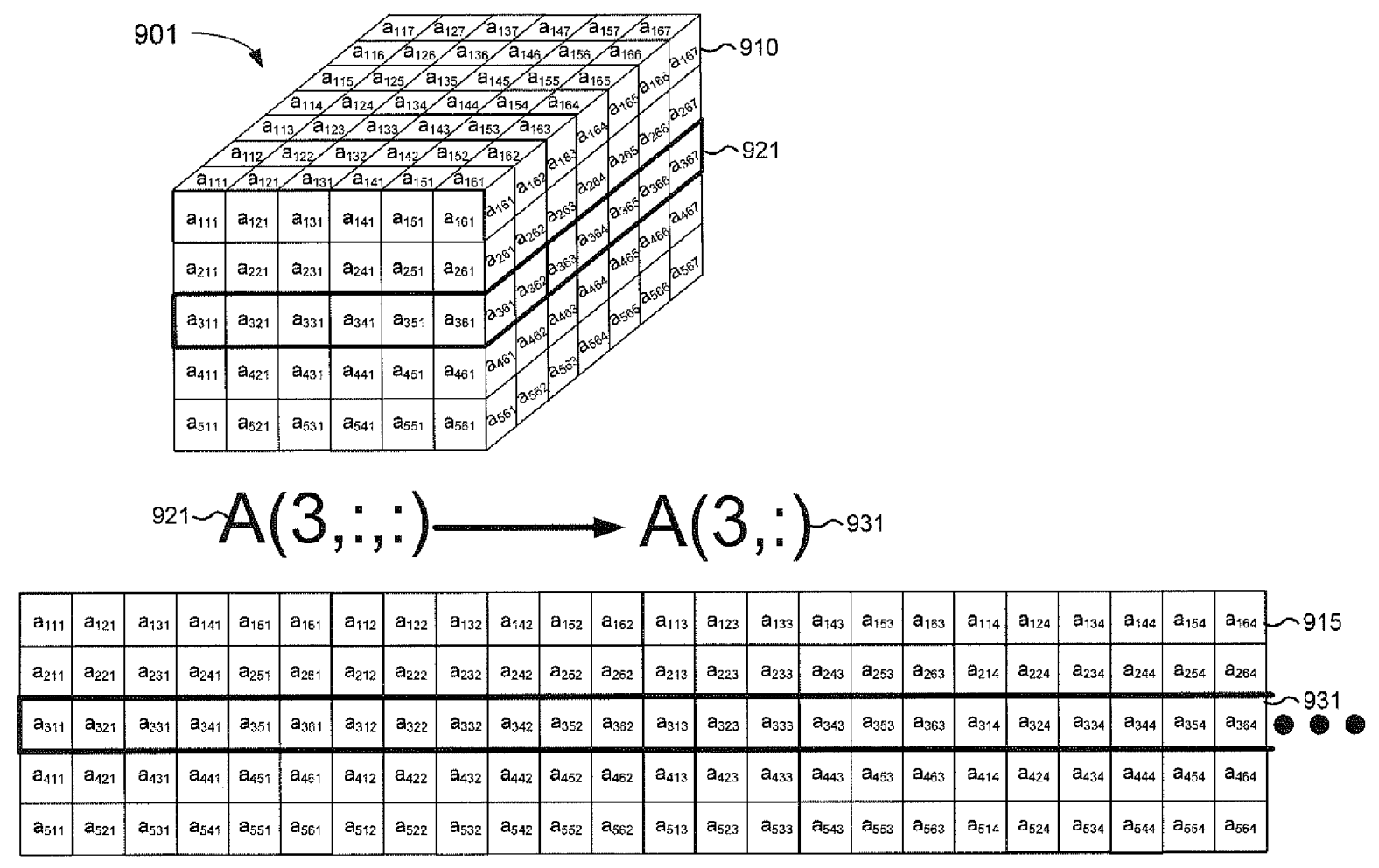

FIG. 9A is a diagram of a first example 901 of a data structure 910 before and after an index folding operation according to an implementation described herein. As shown in FIG. 9A, data structure 910 may include a set of two hundred and ten data elements organized as a 5-by-6-by-7 three dimensional matrix. In this example, a ':' character may correspond to a vector index that includes all possible values of an index. Thus, indexing expression A(3, :, :) 921 may reference data elements associated with a value of 3 in the first index, associated with all possible values of the second index (in this case, values 1 to 6), and associated with all possible values of the third index (in this case, values 1 to 7). In other words, indexing expression A(3, :, :) 921 may reference all data elements of data structure 910 in the third row.

The second and third indices of indexing expression A(3, :, :) 921 may be folded into a single index represented by a ':' character to generate indexing expression A(3, :) 931. In order for indexing expression A(3, :) 931 to reference the same data elements of data structure 910 as were referenced by indexing expression A(3, :, :) 921, reshaped data structure 915 may be utilized. Reshaped data structure 915 may be a virtual representation of data structure 910 and may correspond to a two dimensional 5-by-42 matrix. As can be seen in FIG. 9A, indexing expression A(3, :) 931 may reference the same data elements in reshaped data structure 915 as are referenced by indexing expression A(3, :, :) 921 in data structure 910.

Figure 9B:
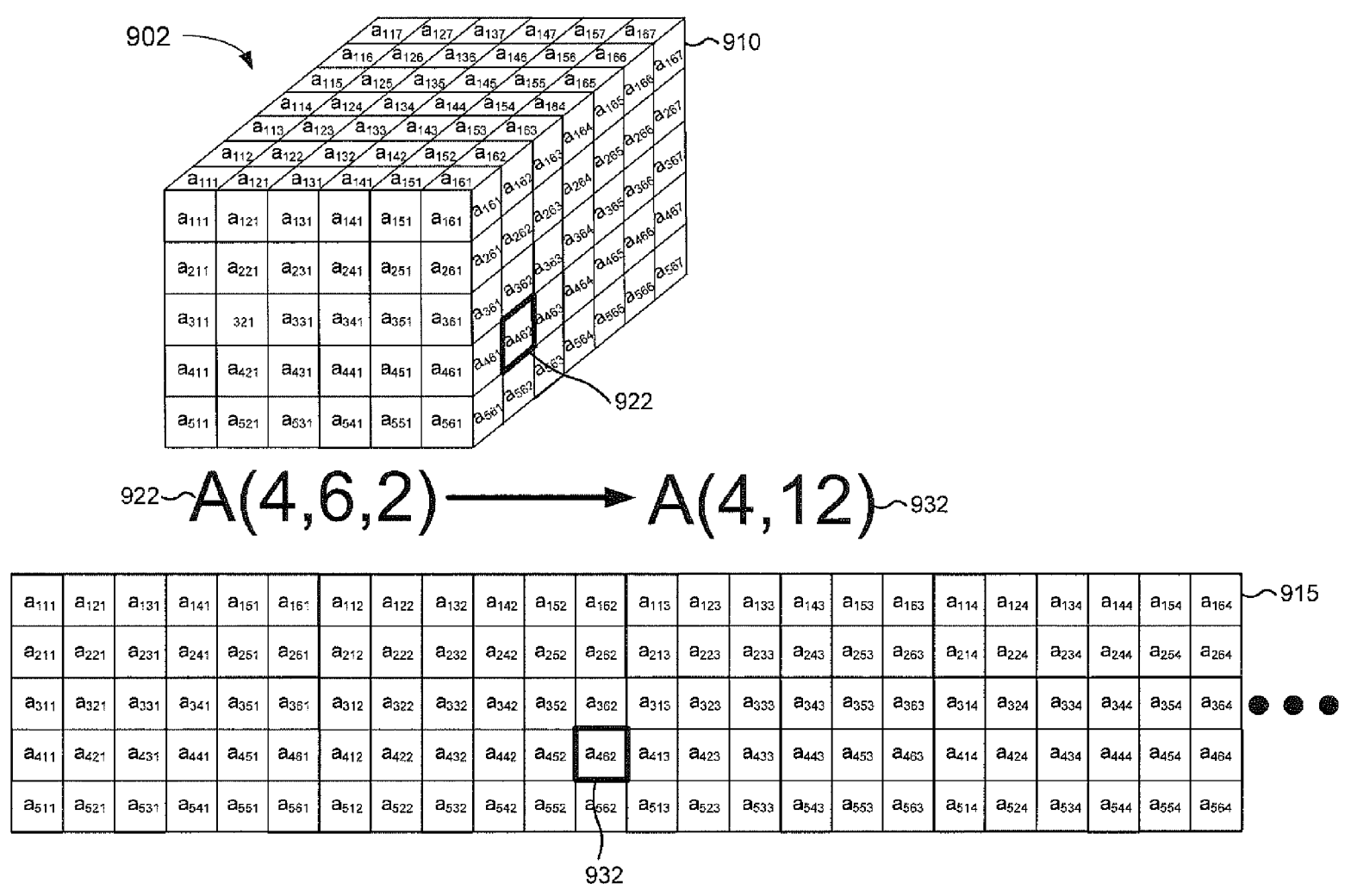

FIG. 9B is a diagram of a second example 902 of data structure 910 before and after an index folding operation according to an implementation described herein. As shown in FIG. 9B, indexing expression A(4, 6, 2) 922 may reference a data element associated with a value of 4 in the first index, a value of 6 in the second index, and a value of 2 in the third index.

The second and third indices of indexing expression A(4, 6, 2) 922 may be folded into a single index with a scalar value of '12' to generate indexing expression A(4, 12) 932. In order for indexing expression A(4, 12) 932 to reference the same data element of data structure 910 as was referenced by indexing expression A(4, 6, 2) 922, reshaped data structure 915 may be utilized. As can be seen in FIG. 9B, indexing expression A(4, 12) 932 may reference the same data element in reshaped data structure 915 as is referenced by indexing expression A(4, 6, 2) 922 in data structure 910.

Figure 9C:
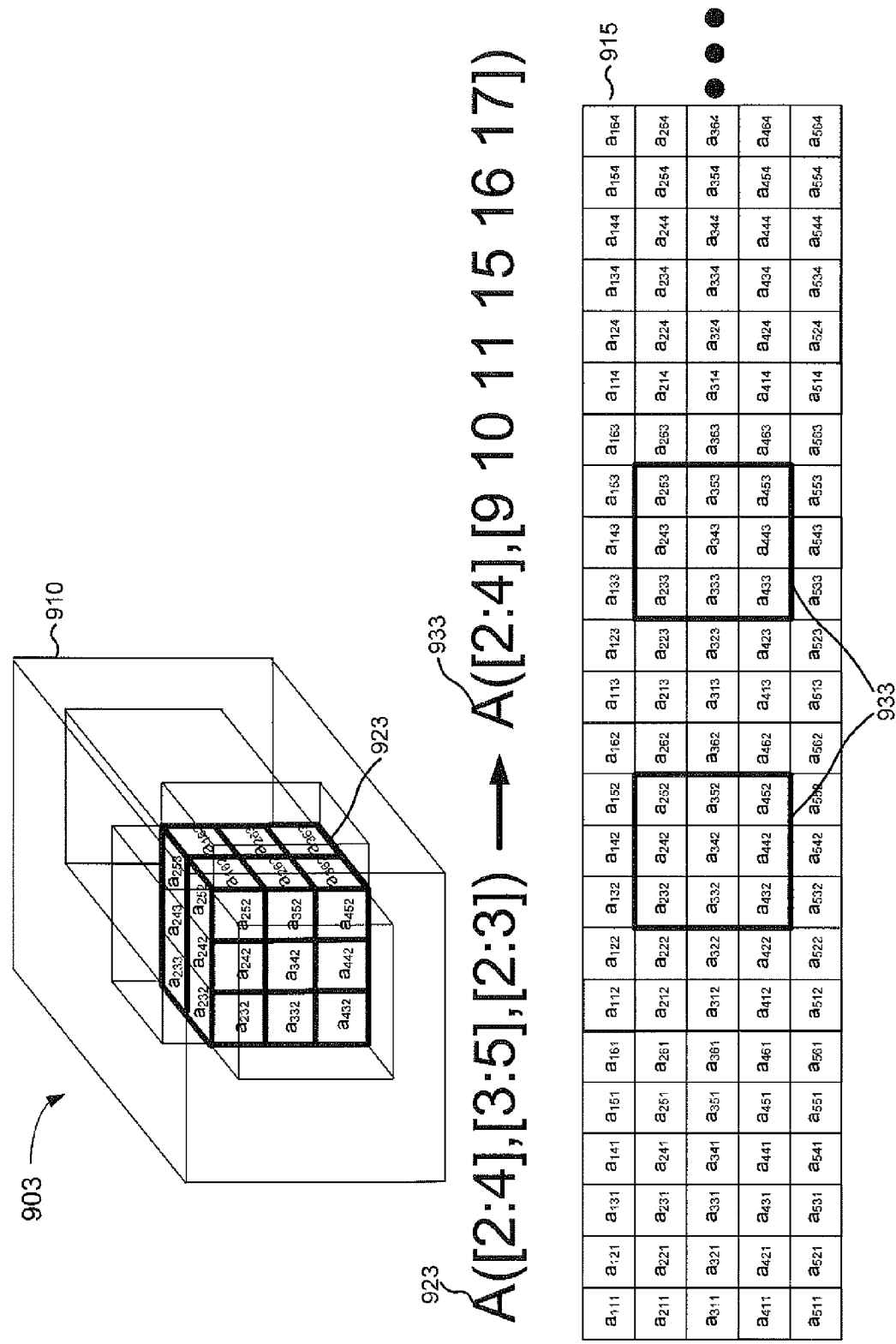
FIG. 9C is a diagram of a third example of a data structure before and after an index folding operation according to an implementation described herein.

FIG. 9C is a diagram of a third example 903 of data structure 910 before and after an index folding operation according to an implementation described herein. In this example, an expression of the form '[a:b]' may correspond to a vector index that references data elements associated with a range of values from a to b in the index, and an expression of the form '[a b c]' may correspond to a vector index that references data elements associated with values a, b, and c in the index. As shown in FIG. 9C, indexing expression A([2:4], [3:5], [2:3]) 923 may reference data elements associated with a range of values from 2 to 4 in the first index, associated with a range of values from 3 to 5 in the second index, and associated with a range of values from 2 to 3 in the third index.

The second and third indices of indexing expression A([2:4], [3:5], [2:3]) 923 may be folded into a single vector index [9 10 11 15 16 17] to generate indexing expression A([2:4], [9 10 11 15 16 17]) 933. In order for indexing expression A([2:4], [9 10 11 15 16 17]) 933 to reference the same data elements of data structure 910 as were referenced by indexing expression A([2:4], [3:5], [2:3]) 923, reshaped data structure 915 may be utilized. As can be seen in FIG. 9C, A([2:4, [9 10 11 15 16 17]) 933 may reference the same data elements in reshaped data structure 915 as is referenced by A([2:4], [3:5], [2:3]) 923 in data structure 910.

Figure 10:
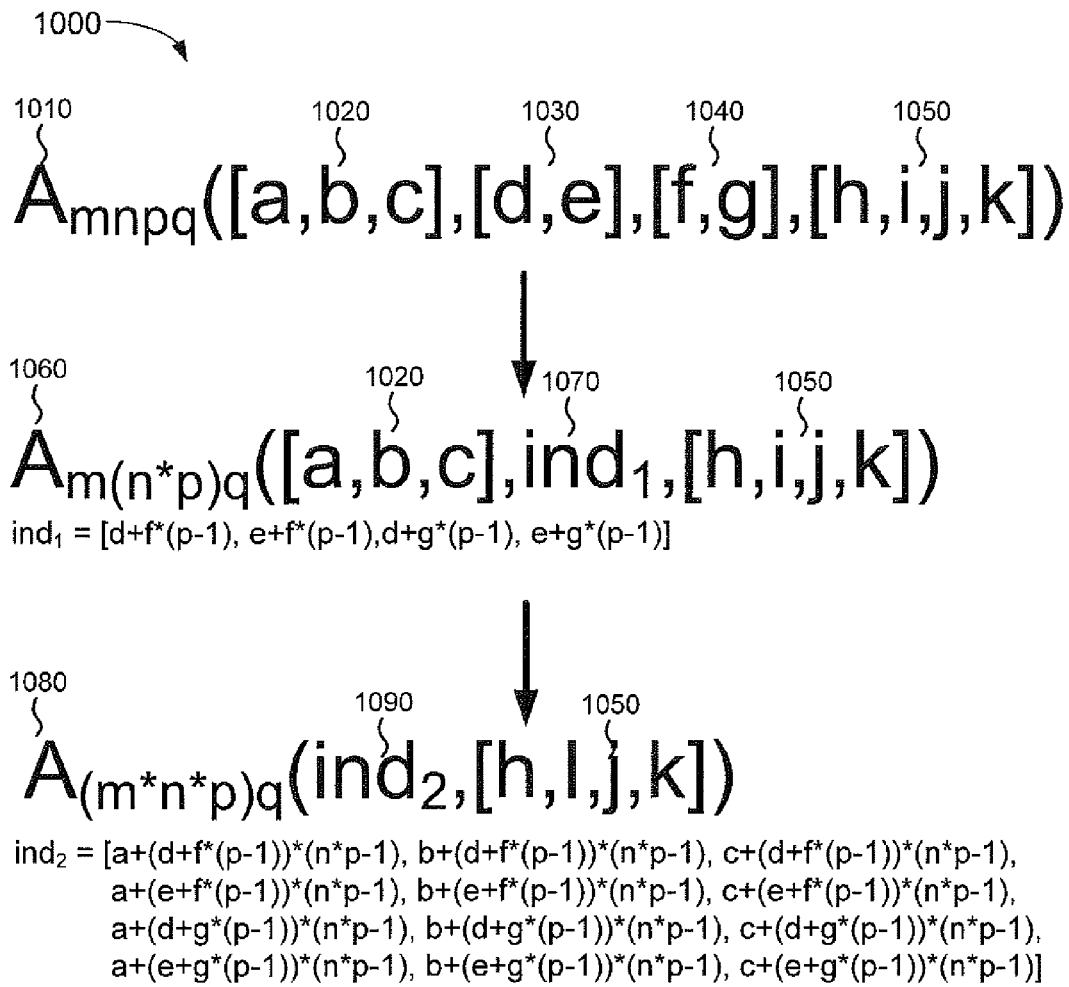
FIG. 10 is a diagram of an example indexing expression before and after an index folding operation according to an implementation described herein.

FIG. 10 is a diagram of an example 1000 indexing expression 1010 before and after an index folding operation according to an implementation described herein. Indexing expression 1010 may reference data elements in a m-by-n-by-p-by-q data structure (i.e., a data structure with m×n×p×q data elements). Indexing expression 1010 may include four vector indices: a first index [a, b, c] 1020 that references elements associate with values a, b, and c; a second index [d, e] 1030 that references elements associated with values d and e; a third index [f, g] 1040 associated with values f and g; and a fourth index [h, i, j, k] 1050 associated with values h, i, j, and k.

When selecting a pair of indices to fold in indexing expression 1010, a pair of adjacent indices may be selected that are associated with a smallest product of number of referenced data elements. In indexing expression 1010, first index [a, b, c] 1020 may include 3 values and second index [d, e] 1030 may include 2 values, and thus the product of number of referenced data elements of first index [a, b, c] 1020 and second index [d, e] 1030 may be 6. Similarly, the product of number of referenced elements of second index [d, e] 1030 and third index [f, g] 1040 may be 4 and the product of number of referenced elements of third index [f, g] 1040 and fourth index [h, i, j, k] 1050 may be 8. In this case, the smallest product of number of referenced data elements may be between second index [d, e] 1030 and third index [f, g] 1040. Therefore, second index [d, e] 1030 and third index [f, g] 1040 may be selected for index folding and may be folded into a first new index $ind_1$ 1070 to generate indexing expression 1060. First new index $ind_1$ 1070 may be a vector index with 4 values that reference the same data elements, in a first reshaped data structure, as referenced by second index [d, e] 1030 and third index [f, g] 1040.

When selecting another pair of indices to fold, a pair of adjacent indices may again be selected that are associated with a smallest product of number of referenced data elements. In indexing expression 1060, the product of number of referenced elements of first index [a, b, c,] 1020 and first new index $ind_1$ 1070 may be 12; and the product of number of referenced elements of first new index $ind_1$ 1070 and fourth index [h, i, j, k] 1050 may be 16. In this case, the smallest product of number of referenced data elements may be between first index [a, b, c,] 1020 and first new index $ind_1$ 1070. Therefore, if further index folding needs to be performed, first index [a, b, c,] 1020 and first new index $ind_1$ 1070 may be selected for index folding and may be folded into a second new index $ind_2$ 1090 to generate indexing expression 1080. Second new index $ind_2$ 1090 may be a vector index with 12 values that reference the same data elements, in a second reshaped data structure, as referenced by first index [a, b, c,] 1020 and first new index $ind_1$ 1070 in the first reshaped data structure.

Figure 11:
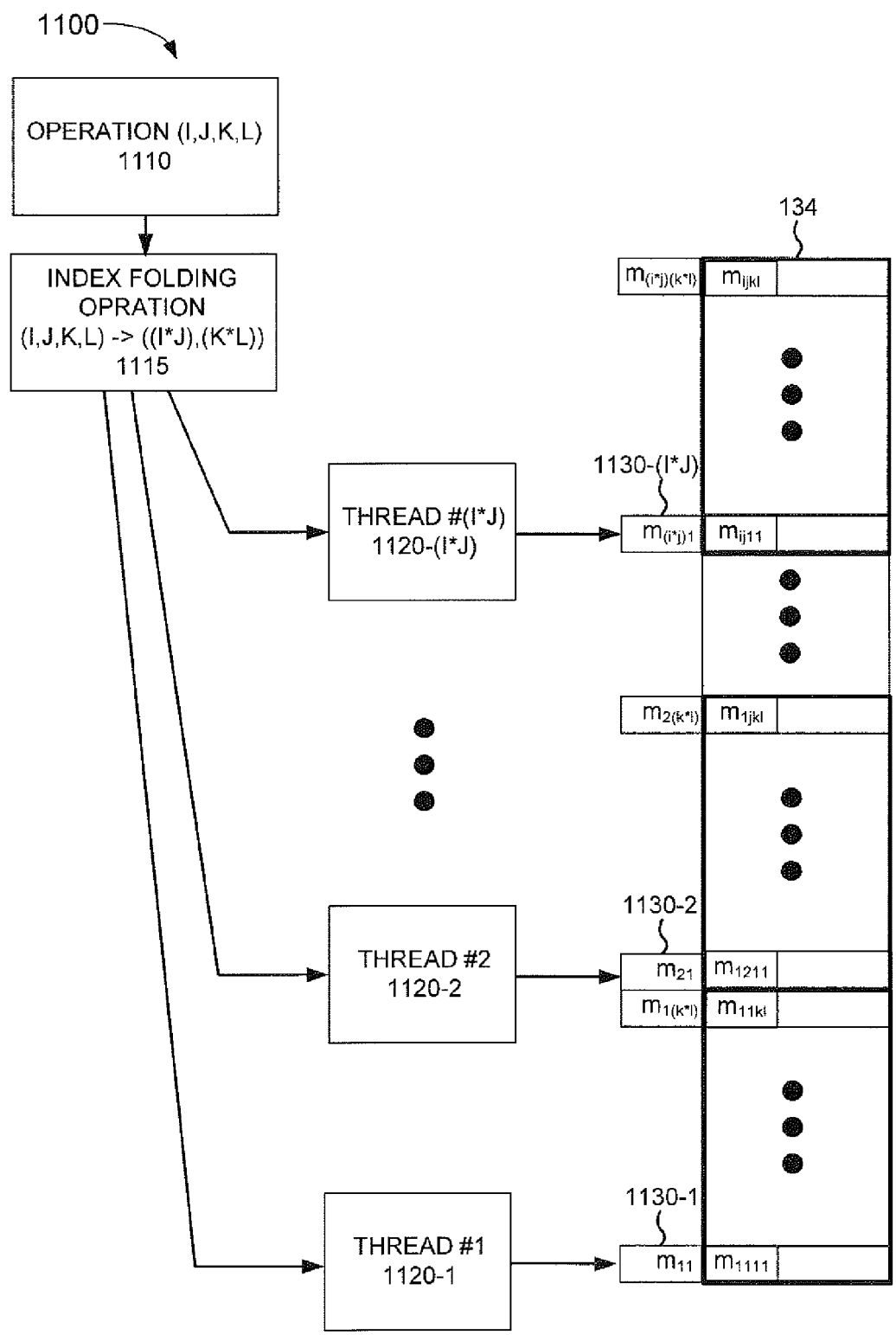
FIG. 11 is a diagram of an example cache access operation that uses index folding.

FIG. 11 is a diagram of an example 1100 of a cache access operation that uses index folding for efficient parallel cache accesses of an indexed data structure. In example 1100, an operation 1110 on a data structure stored in a cache associated with CPU cache device 134 may include four indices I, J, K, and L. Computer device 125 may receive information that CPU cache device 134 is configured to perform parallel cache accesses using two indices. For example, computer device 125 may access a library of functions associated with CPU cache device 134 and may identify a native cache access function that uses two indices. Based on this information, computer device 125 may determine that an optimum number of indices for operation 1110 corresponds to two indices. Therefore, computer device 125 may perform an index folding operation 1115 on the indexing expression associated with operation 1110 to reduce the indexing expression from the four indices of I, J, K, L to two indices (I*J) and (K*L).

Computer device 125 may generate threads based on the two indices. For example, computer device 125 may generate I*J threads 1120-1 to **1120-(I*J)**, one for each values in the range from 1 to I*J. Each thread 1120 may perform a series of K*L accesses 1130, based on second index K*L, on data referenced by the indexing expression of operation 1100 and stored in a cache associated with CPU cache device 134.

Figure 12:
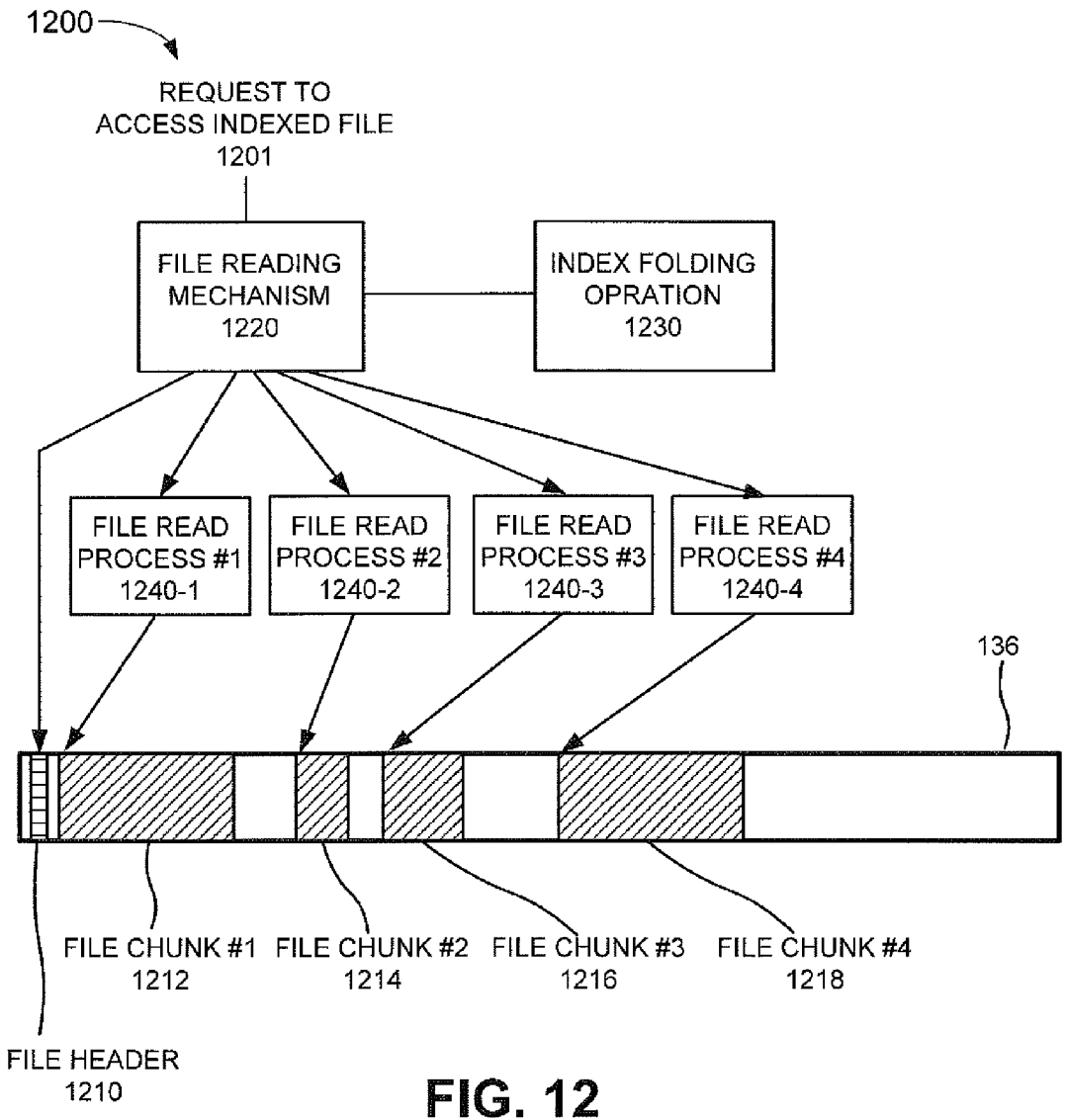
FIG. 12 is a diagram of an example file access operation that uses index folding.

FIG. 12 is a diagram of an example 1200 of a file access operation that uses index folding. Example 1200 may include a request 1201 to access an indexed file. Computer device 125 may receive information that file reading mechanism 1220 (e.g., associated with persistent storage device 136) is configured to perform parallel file accesses and that file reading mechanism 1220 may read contiguous chunks of data more efficiently than having to perform large movements from one section of data to another section of data. For example, persistent storage device 136 may store a file header 1210 associated with the requested file. File header 1210 may store information (e.g., location addresses) for contiguous file chunks associated with the request file. For example, the requested file may be stored as four separate chunks that include file chunk #1 1212, file chunk #2 1214, file chunk #3 1216, and file chunk #4 1218. Request 1201 to access the indexed file may include a request to access particular elements of the file using an indexing expression associated with a particular number of indices.

Computer device 125 may determine that an optimum file access operation may be performed with a different number of indices based on information stored in file header 1210. For example, computer device 125 may determine that multiple indices of the indexing expression may be folded into a new index to generate an indexing expression with an optimum number of indices that may be used to generate file read processes 1240-1 to 1240-4. Thus, computer device 125 may perform an index folding operation 1230 and file reading mechanism 1220 may generate read processes 1240-1 to 1240-4 based on the indexing expression with the optimum number of indices. Read process 1240-1 may read file chunk #1 1212, read process 1240-2 may read file chunk #2 1214, read process 1240-3 may read file chunk #3 1216, and read process 1240-4 may read file chunk #4 1218.

Figure 13:
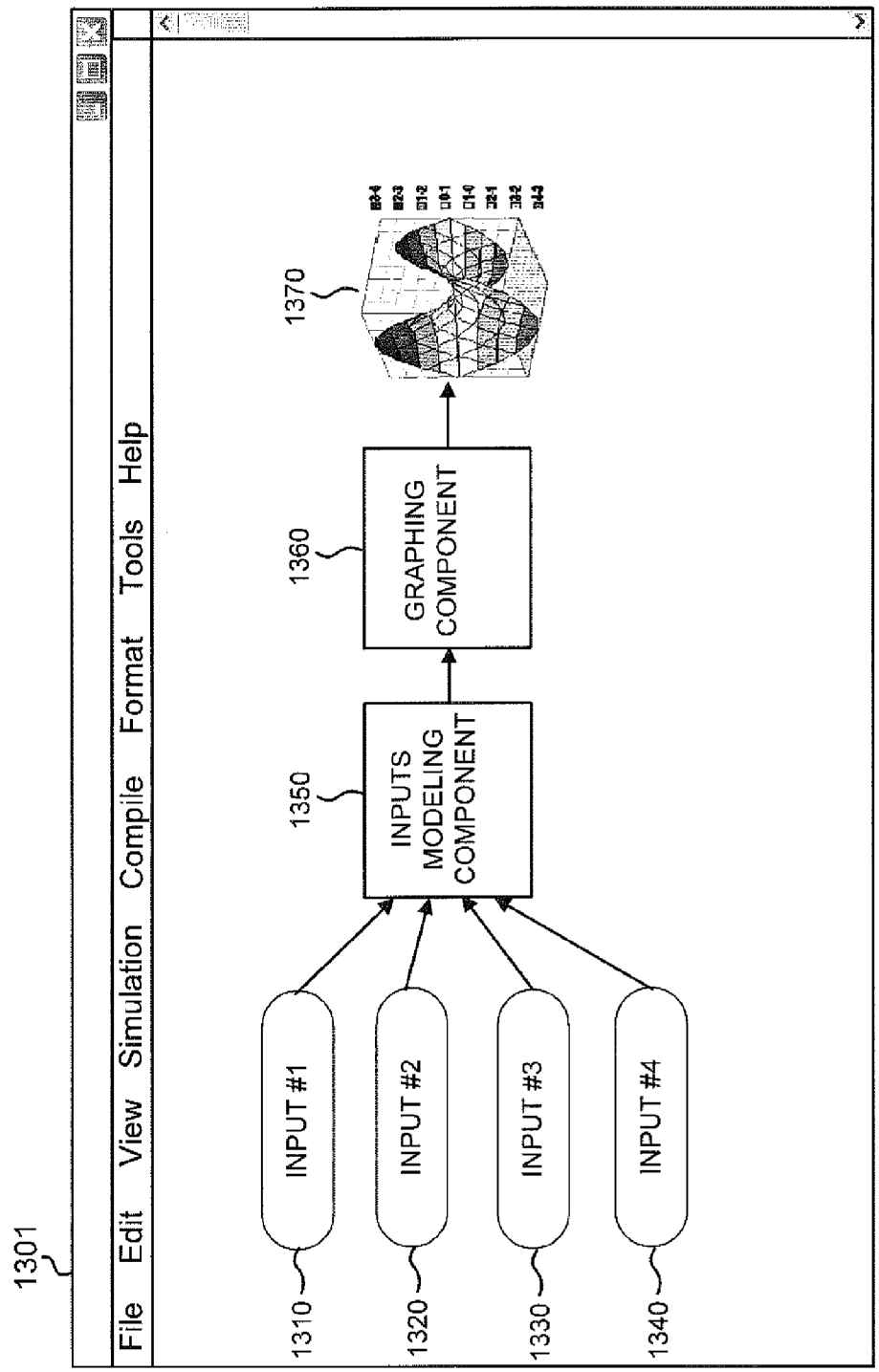
FIG. 13 is a diagram of an example user interface for implementing a graphical model that uses index folding.

FIG. 13 is a diagram of an example user interface 1301 for implementing a graphical model that uses index folding. As shown in FIG. 13, user interface 1301 may correspond to a user interface for a graphical modeling application that enables a user to simulate dynamic systems via graphical components and relationships specified between the graphical components. A user may create input components 1310-1340 to specify a group of inputs. The user may further create an inputs modeling component 1350 that may simulate a particular model based on input components 1310-1340. For example, the user may specify a particular function that is to be computed over a period of time as input values are received from input components 1310-1340. The user may further create a graphing component 1360 that may generate a graph based on an output received from inputs modeling component 1350. The user may create a display component 1370 to provide a visual display generated by graphical component 1360.

A compiling tool associated with the graphical modeling application may generate code, which is to be executed by computer device 125, where the generated code is based on the graphical model created by the user when the model is executed. The generated code may include index folding instructions based on the processes described herein. For example, inputs modeling component 1350 may generate an indexing expression that includes four indices. Graphing component 1360 may include a call to GPU device 132 to perform parallel processing of data received from inputs modeling component 1350. The generated code may include instructions that, prior to invoking a call to GPU device 132, fold the indexing expression received from inputs modeling component 1350 into an indexing expression with three indices, based on the fact that GPU device 132 includes an optimum memory copying operation that uses three indices.

While FIG. 13 describes an example where code is generated through a graphical modeling application, in another example, the code may be generated using another technique. For example, the code may be generated by converting expressions in the MATLAB® language, C language, or another programming language, into executable code associated with a same or a different language. For example, an application for writing C programs may be used to generate C code, or an application for writing programs in MATLAB® language may be used to generate MAT-LAB® language code. As another example, a C program or a program in MATLAB® language may be used to generate machine language code. The generated code may include optimizations to improve speed, memory use, code size, optimizations to take advantage of particular hardware, and/or any other optimization to improve performance of the generated code. The generated code, which includes index folding instructions, may be stored in a storage device for subsequent use by the modeling application or for subsequent use by another device. The generated code may be deployed on a target environment, such as, for example, an embedded system. The deployed generated code may allow the embedded system to take advantage of index folding operations when performing parallel operations.

While processes and examples described herein include folding a pair of sequentially numbered adjacent indices, in other example, a pair of indices that is folded into a new single index need not be sequentially numbered and/or need not be adjacent. For example, an indexing expression may include indices that are sequenced using non-sequential or non-consecutive numbers (e.g., an indexing expression such as A(X(4), X(1), X(7), X_5)). As another example, index folding unit 330 may select a pair of non-adjacent indices to fold into a new index in order to make the index folding operation more efficient. In one example, index folding unit 330 may renumber indices in order to generate an indexing expression with a pair of adjacent indices that may be folded efficiently. For example, assume an indexing expression A(X_1, :, X_3, :, X_5). Index folding unit 330 may generate a new set of indices Y_1=X_1, Y_2=':', Y_3=':', Y_4=X_3, and Y_5=X_5 and may reshape data structure A to accommodate the new set of indices. Index folding unit 330 may then convert the original indexing expression into a new indexing expression Amod1(Y_1, Y_2, Y_3, Y_4, Y_5), where indices Y_2 and Y_3 are now a pair of adjacent indices that both reference all elements of an index and which may be efficiently folded into a new index Y_2_3=':' that references all elements of an index. Thus, a new indexing expression Amod2(Y_1, :, Y_4, Y_5) may be generated, which includes a folded index.

The foregoing description of implementations, described above, provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4A, 4B, 5A, 5B, 6, 7, and 8, the order of the blocks may be modified in other implementations. Further, non-dependent blocks may be performed in parallel.

Also, certain portions of the implementations may have been described as a "component," "unit," or "generator" that performs one or more functions. The terms "component," "unit," and "generator" may include hardware, such as a processor, an ASIC, and/or a FPGA, or a combination of hardware and software (e.g., software running on a processor). Moreover, while indexing expressions and data structures have been described that reference, or include, one or more data elements, the systems and methods described herein may be applied to an empty data structure (e.g., a data structure with zero data elements).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
for a first indexing expression that includes a plurality of indices,
determining that the first indexing expression does not include a pair of adjacent indices that reference particular elements of data,
the determining that the first indexing expression does not include the pair of adjacent indices that reference the particular elements of the data being performed by one or more processors;
determining whether the first indexing expression includes a pair of adjacent scalar indices after the determining that the first indexing expression does not include the pair of adjacent indices that reference the particular elements of the data,
the determining whether the first indexing expression includes the pair of adjacent scalar indices being performed by the one or more processors;
identifying a particular pair of adjacent indices, of the plurality of indices, when it is determined that the first indexing expression does not include the pair of scalar adjacent indices,
the identifying the particular pair of adjacent indices being performed by the one or more, processors;
determining an optimum quantity of indices associated with performing a parallel processing operation;
generating based on the optimum quantity of indices, a second indexing expression that includes one or more indices referencing one or more elements referenced by the particular pair of adjacent indices,
the generating the second indexing expression comprising performing a scalar folding on the particular pair of adjacent indices, and
the generating the second indexing expression being performed by the one or more processors; and
performing the parallel processing operation based on the second indexing expression,
the performing the parallel processing operation being performed by the one or more processors.

2. The method of claim 1, where the particular elements include all elements of an index.

3. The method of claim 1, where one of the plurality of indices references a single data element of the particular elements of the data.

4. The method of claim 1, where the identifying the particular pair of adjacent indices comprises:
determining that a first index references a first quantity of the particular elements, determining that a second index, located adjacent to the first index, references a second quantity of the particular elements, and determining whether the first index and the second index are the particular pair of adjacent indices based on the first quantity and the second quantity.

5. The method of claim 4, where the identifying the first index and the second index as the particular pair of adjacent indices comprises:

determining a product of the first quantity and the second quantity, determining that the product is less than one or more other products calculated for one or more other pairs of indices of the plurality of indices, and identifying the first index and the second index as the particular pair of adjacent indices based on the product being less than the one or more other products.

6. The method of claim 1, where the generating the second indexing expression comprises:

generating the one or more indices that references same elements, of the particular elements, that are referenced by the particular pair of adjacent indices, and generating the second indexing expression that includes the one or more indices.

7. The method of claim 1, further comprising:
determining a first quantity of indices based on the one or more processors;
determining a second quantity of indices in the plurality of indices of the first indexing expression; and
determining that the second quantity of indices is greater than the first quantity of indices, where the generating the second indexing expression comprises:
generating the second indexing expression after determining that the second quantity of indices is greater than the first quantity of indices.

8. The method of claim 1, further comprising:
folding the pair of adjacent scalar indices, into a single scalar index, when it is determined that the first indexing expression includes the pair of adjacent scalar indices.

9. The method of claim 8, further comprising:
generating a third indexing expression based on the single scalar index.

10. A non-transitory computer-readable medium storing instructions, the instructions comprising:
one or more instructions that, when executed by at least one processor of a device, cause the at least one processor to:
for a first indexing expression,
determine that the first indexing expression does not include a pair of adjacent indices that reference particular elements of data;
determine whether the first indexing expression includes a pair of adjacent scalar indices after the determining that the first indexing expression does not include the pair of adjacent indices that reference the particular elements of the data;
identify a particular pair of adjacent indices, of the first indexing expression, when it is determined that the first indexing expression does not include the pair of adjacent scalar indices;
determine an optimum quantity of indices associated with performing a parallel processing operation;
generate, based on the optimum quantity of indices, a second indexing expression that includes one or more indices referencing one or more elements referenced by the particular pair of adjacent indices,
the generating the second indexing expression comprising folding the particular pair of adjacent indices; and
perform the parallel processing operation based on the second indexing expression.

11. The non-transitory computer-readable medium of claim 10, where the instructions further comprise:
one or more instructions that, when executed by the at least one processor, cause the at least one processor to:
determine that the first indexing expression cannot be processed based on the optimum quantity of indices,
the generating the second indexing expression being based on the determining that the first indexing expression cannot be processed based on the optimum quantity of indices.

12. The non-transitory computer-readable medium of claim 10, where the particular elements of the data include all elements of the data.

13. The non-transitory computer-readable medium of claim 10, where the one or more instructions to identify the particular pair of adjacent indices comprise:
one or more instructions that, when executed by the at least one processor, cause the at least one processor to:
determine that a first index references a first quantity of the particular elements,
determine that a second index located adjacent to the first index, references a second quantity of the particular elements,
determine a product of the first quantity and the second quantity, and
determining whether the first index and the second index are the particular pair of adjacent indices based on the product.

14. The non-transitory computer-readable medium of claim 10, where the instructions further comprise:
one or more instructions that, when executed by the at least one processor, cause the at least one processor to:
receive a request to process the first indexing expression before determining whether the first indexing expression includes the pair of adjacent indices that reference the particular elements of the data.

15. The non-transitory computer-readable medium of claim 10, where the instructions further comprise:
one or more instructions that, when executed by the at least one processor, cause the at least one processor to:
fold the pair of adjacent scalar indices, into a single scalar index, when it is determined that the first indexing expression includes the pair of adjacent scalar indices.

16. A system comprising:
a memory; and
one or more processors to:
for a first indexing expression,
determine that the first indexing expression does not include a pair of adjacent indices that reference particular elements of data;
determine whether the first indexing expression includes a pair of adjacent scalar indices after the determining that the first indexing expression does not include the pair of adjacent indices that reference the particular elements of the data;
identify a particular pair of adjacent indices, of the first indexing expression, when it is determined that the first indexing expression does not include the pair of adjacent scalar indices;

determine a particular quantity of indices that can be handled by the one or more processors during a parallel processing operation;

generate, based on the particular quantity of indices, a second indexing expression that includes one or more indices referencing one or more elements referenced by the particular pair of adjacent indices, the generating the second indexing expression comprising folding the particular pair of adjacent indices; and perform the parallel processing operation based on the second indexing expression.

17. The system of claim 16, where the one or more processors are further to:

determine a quantity of indices in the first indexing expression; and determine that the quantity of indices in the first indexing expression cannot be handled based on the particular quantity of indices, the generating the second indexing expression being based on the determining that the quantity of indices in the first indexing expression cannot be handled.

18. The system of claim 17, where, when determining that the quantity of indices in the first indexing expression cannot be handled, the one or more processors are to:

determine that the quantity of indices in the first indexing expression is greater than the particular quantity of indices, and determine that the quantity of indices in the first indexing expression cannot be handled based on determining that the quantity of indices in the first indexing expression is greater than the particular quantity of indices.

19. The system of claim 16, where, when generating the second indexing expression, the one or more processors are to:

generate a new index that references same elements that are referenced by the particular pair of adjacent indices, and replace the particular pair of adjacent indices, in the first indexing expression, with the new index to build the second indexing expression.

20. The system of claim 16, where the one or more processors are further to:

fold the pair of adjacent scalar indices, into a single scalar index, when it is determined that the first indexing expression includes the pair of adjacent scalar indices.

* * * * *

UNITED STATES PATENT AND TRADEMARK OFFICE
CERTIFICATE OF CORRECTION

| | | |
|---|---|---|
| PATENT NO. | : 9,519,671 B1 | Page 1 of 1 |
| APPLICATION NO. | : 14/512088 | |
| DATED | : December 13, 2016 | |
| INVENTOR(S) | : Stefansson et al. | |

It is certified that error appears in the above-identified patent and that said Letters Patent is hereby corrected as shown below:

On the Title Page

Item (54) and in the Specification, Column 1, Line 1, correct the title:
"FOLDING PAIR OF ADJACENT INDICES BASED ON OPTIMUM QUANTITY OF INDUCES FOR PARALLEL PROCESSING"

To:
--FOLDING PAIR OF ADJACENT INDICES BASED ON OPTIMUM QUANTITY OF INDICES FOR PARALLEL PROCESSING--

Signed and Sealed this
Sixth Day of June, 2017

Michelle K. Lee
*Director of the United States Patent and Trademark Office*